(12) United States Patent
Alavi et al.

(10) Patent No.: US 11,804,889 B2
(45) Date of Patent: Oct. 31, 2023

(54) ORBITAL ANGULAR MOMENTUM (OAM) MODE MULTIPLEXING TRANSMISSION SYSTEM

(71) Applicant: Intel Corporation, Santa Clara, CA (US)

(72) Inventors: Hossein Alavi, Portland, OR (US); Harry G. Skinner, Beaverton, OR (US); Adesoji J. Sajuyigbe, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 79 days.

(21) Appl. No.: 17/475,593

(22) Filed: Sep. 15, 2021

(65) Prior Publication Data

US 2022/0029690 A1    Jan. 27, 2022

Related U.S. Application Data

(63) Continuation of application No. 16/472,834, filed as application No. PCT/US2016/068895 on Dec. 28, 2016, now Pat. No. 11,153,002.

(51) Int. Cl.

| | | |
|---|---|---|
| *H04N 21/2365* | (2011.01) | |
| *H04B 7/06* | (2006.01) | |
| *H01Q 3/34* | (2006.01) | |
| *H01Q 21/20* | (2006.01) | |

(52) U.S. Cl.
CPC .............. *H04B 7/0697* (2013.01); *H01Q 3/34* (2013.01); *H01Q 21/20* (2013.01)

(58) Field of Classification Search
CPC ......... H04B 7/0697; H01Q 3/34; H01Q 21/20

USPC ........................................................ 370/537
See application file for complete search history.

(56) References Cited

U.S. PATENT DOCUMENTS

| | | | |
|---|---|---|---|
| 7,034,753 B1 | 4/2006 | Elsallal et al. | |
| 10,348,394 B1* | 7/2019 | Bakr | ............... H04L 5/14 |
| 11,153,002 B2 | 10/2021 | Alavi et al. | |
| 2007/0076659 A1* | 4/2007 | Hara | ............ H04B 7/0654 |
| | | | 370/329 |
| 2012/0207470 A1* | 8/2012 | Djordjevic | .......... H04J 14/06 |
| | | | 398/44 |
| 2013/0148965 A1 | 6/2013 | Losio et al. | |
| 2013/0235744 A1 | 9/2013 | Chen et al. | |

(Continued)

FOREIGN PATENT DOCUMENTS

WO    WO-2018125084 A1    7/2018

OTHER PUBLICATIONS

Sub, Xue-hong, "A double-structure modal scroll wave OAM electromagnetic array antenna", CN-206471491-A, Sep. 5, 2017, 10 pages. (Year: 2017).*

(Continued)

*Primary Examiner* — Sai Ming Chan
(74) *Attorney, Agent, or Firm* — VIERING,JENTSCHURA&PARTNERmbB

(57) ABSTRACT

Orbital angular momentum (OAM)-based multiplexing includes accessing distinct data streams to be multiplexed and transmitted according to a corresponding plurality of OAM modes. The OAM-based multiplexing further includes generating a set of antenna element-specific signals corresponding to individual antenna elements of an antenna array. Individual ones of the antenna element-specific signals are based on corresponding distinct data streams.

49 Claims, 16 Drawing Sheets

(56) References Cited

U.S. PATENT DOCUMENTS

| | | | |
|---|---|---|---|
| 2015/0098697 A1 | 4/2015 | Marom et al. | |
| 2015/0188660 A1 | 7/2015 | Byun et al. | |
| 2015/0333865 A1 | 11/2015 | Yu et al. | |
| 2015/0351105 A1* | 12/2015 | Lee | H04W 72/54 370/329 |
| 2015/0372398 A1* | 12/2015 | Dudorov | H01Q 19/17 342/368 |
| 2016/0043794 A1* | 2/2016 | Ashrafi | H04L 27/2017 370/329 |
| 2016/0372836 A1* | 12/2016 | Ashrafi | H01Q 25/007 |
| 2017/0012732 A1 | 1/2017 | Kowalevicz et al. | |
| 2017/0062910 A1 | 3/2017 | Iida | |
| 2017/0093606 A1* | 3/2017 | Dutronc | H04L 5/0007 |
| 2017/0099079 A1* | 4/2017 | Gross | H02J 13/00028 |
| 2017/0117626 A1 | 4/2017 | Sajuyigbe et al. | |
| 2017/0163451 A1* | 6/2017 | Willner | H04B 7/0413 |
| 2017/0188412 A1* | 6/2017 | Noriega | H04W 88/08 |
| 2017/0353241 A1* | 12/2017 | Fazal | H04B 10/2581 |
| 2018/0039154 A1 | 2/2018 | Hashemi et al. | |
| 2018/0160370 A1* | 6/2018 | Alpert | H04W 52/0225 |
| 2018/0262272 A1* | 9/2018 | Ashrafi | H04L 63/06 |
| 2019/0028165 A1* | 1/2019 | Adachi | H01Q 3/36 |
| 2019/0334609 A1 | 10/2019 | Alavi et al. | |

OTHER PUBLICATIONS

Hideyuki, Tsubo, "Antenna Adjusting Method and Communication System", JP-2017224989-A, Dec. 21, 2017, 29 pages (Year: 2017).*

U.S. Appl. No. 16/472,834 U.S. Pat. No. 11,153,002, filed Jun. 21, 2019, Orbital Angular Momentum-Based Multiplexing With Shared Antenna Elements.

"U.S. Appl. No. 16/472,834, Advisory Action dated Apr. 7, 2021", 3 pgs.

"U.S. Appl. No. 16/472,834, Corrected Notice of Allowability dated Jun. 28, 2021", 8 pgs.

"U.S. Appl. No. 16/472,834, Final Office Action dated Feb. 17, 2021", 25 pgs.

"U.S. Appl. No. 16/472,834, Non Final Office Action dated Aug. 19, 2020", 27 pgs.

"U.S. Appl. No. 16/472,834, Notice of Allowance dated Jun. 9, 2021", 9 pgs.

"U.S. Appl. No. 16/472,834, Response filed Mar. 29, 2021 to Final Office Action dated Feb. 17, 2021", 13 pgs.

"U.S. Appl. No. 16/472,834, Response filed Nov. 18, 2020 to Non Final Office Action dated Aug. 19, 2020", 12 pgs.

"International Application Serial No. PCT/US2016/068895, International Search Report dated Sep. 15, 2017", 3 pgs.

"International Application Serial No. PCT/US2016/068895, Written Opinion dated Sep. 15, 2017", 8 pgs.

* cited by examiner

ORBITAL ANGULAR MOMENTUM (OAM) MODE MULTIPLEXING TRANSMISSION SYSTEM

CROSS-REFERENCE TO RELATED APPLICATION

This application is a continuation of U.S. patent application Ser. No. 16/472,834, filed on Jun. 21, 2019, which is a U.S. National Stage Filing under 35 U.S.C. 371 from International Application No. PCT/US2016/068895, filed on Dec. 28, 2016, each of which application is incorporated herein by reference in its entirety

TECHNICAL FIELD

Some embodiments relate to wireless communications. Some embodiments relate to the Institute of Electrical and Electronic Engineers (IEEE) 802.11 family of standards. For instance, some embodiments relate to one or more of the IEEE 802.11ad, 802.11ax, or 802.11ay standards. Some embodiments relate to wireless networks including 3GPP (Third Generation Partnership Project) networks, 3GPP LTE (Long Term Evolution) networks, 3GPP LTE-A (LTE Advanced) networks, and 3GPP LTE-Advanced Pro networks, although the scope of the embodiments is not limited in this respect. Some embodiments relate to fifth-generation (5G) communications that may use millimeter wave frequencies.

BACKGROUND

The proliferation of mobile internet devices (smartphones, tablets, laptops, and other devices) as well as high bandwidth apps and large file downloads has led to an increasing need for wireless links with larger capacity to support real-time and non-real-time consumption of large amounts of data, including multimedia data. Although the wireless links and networks of today provide acceptable capacity and bandwidth in many usage scenarios, an exponentially increased demand for higher bandwidth is expected in the future, as more and more people and devices access increasingly data-intensive real-time and non-real-time applications and files through wireless links and networks. Such data-intensive uses of the future may use access network backhaul, WAN, LAN, and PAN networks between devices and networks as well as device-to-device communications that can support wireless links that are significantly, e.g. 10×-1000× faster than today's links.

DETAILED DESCRIPTION

The following description and the drawings sufficiently illustrate specific examples to enable those skilled in the art to practice them. A number of examples are described in the context of Wi-Fi and 3GPP communication systems and components thereof. It will be understood that principles described herein are applicable in other types of communication systems, such as Wi-Max networks Wi-Gig networks, Bluetooth or other personal-area networks (PANs), Zigbee or other home-area networks (HANs), wireless mesh networks, and the like, as well as in device-to-device (D2D) communications contexts, without limitation, unless expressly limited by a corresponding claim.

Given the benefit of the present disclosure, persons skilled in the relevant technologies will be able to engineer suitable variations to implement principles of the inventive aspects in other types of communication systems. For example, it will be understood that a base station or e-Node B (eNB) of a 3GPP context is analogous, generally speaking, to a wireless access point (AP) of a WLAN context. Likewise, user equipment (UE) of a 3GPP context is generally analogous to mobile stations (STAs) of WLANs. Various diverse examples may incorporate structural, logical, electrical, process, and other differences. Portions and features of some examples may be included in, or substituted for, those of other examples. Inventive aspects set forth in the claims encompass all presently-known, and after-arising, equivalents of those claims.

Figure 1:
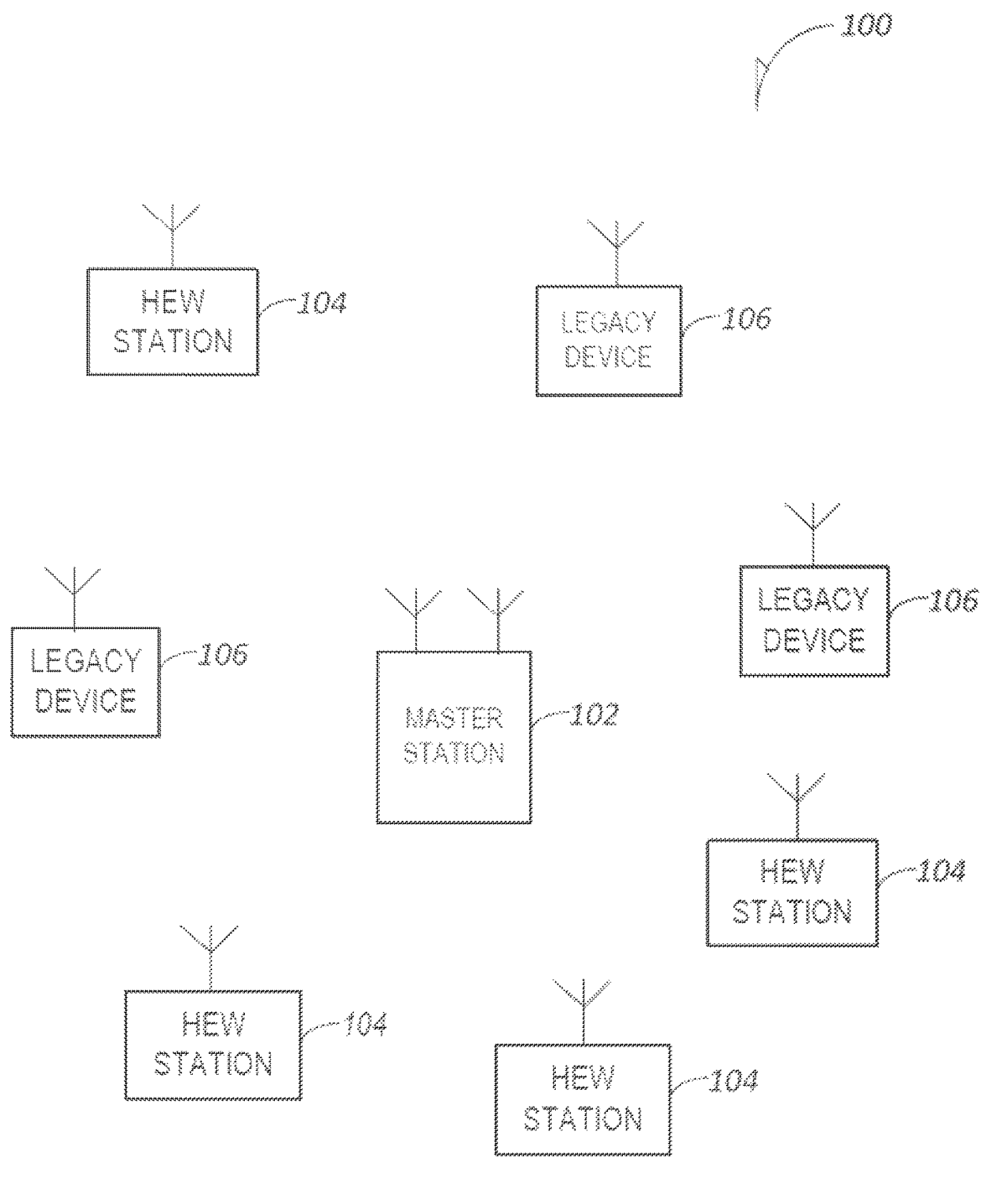
FIG. 1 illustrates a wireless network in accordance with some aspects.

FIG. 1 illustrates a WLAN 100 in accordance with some aspects. The WLAN may comprise a basic service set (BSS) 100 that may include a controlling station 102, which may be an AP, a plurality of high-efficiency wireless (HEW) (e.g., IEEE 802.11ax) STAs 104 and a plurality of legacy (e.g., IEEE 802.11n/ac) devices 106.

The controlling station 102 may be an AP using the IEEE 802.11 to transmit and receive. The controlling station 102 may be a device using peer-to-peer communications with other devices and using 802.11 and/or 3GPP cellular standards. The controlling station 102 may use other communications protocols instead or in addition to aforementioned standards like Bluetooth Low Energy. The IEEE 802.11 protocol may be IEEE 802.11ax, 802.11ad, or the like. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). In some aspects, the 802.11 system may include an antenna structure operated as one or more arrays to generate Orbital Angular Momentum (OAM) beams of varying OAM modes.

The legacy devices 106 may operate in accordance with one or more of IEEE 802.11 a/b/g/n/ac/ad/af/ah/aj, or another legacy wireless communication standard. The legacy devices 106 may be STAs or IEEE STAs. The HEW STAs 104 may be wireless transmit and receive devices such as cellular telephone, smart telephone, handheld wireless device, wireless glasses, wireless watch, wireless personal device, tablet, or another device that may be transmitting and receiving using the IEEE 802.11 protocol such as IEEE 802.11ax or another wireless protocol.

The controlling station 102 may communicate with legacy devices 106 in accordance with legacy IEEE 802.11 communication techniques. In some examples, the controlling station 102 may also be configured to communicate with HEW STAs 104 in accordance with legacy IEEE 802.11 communication techniques.

In some aspects, a HEW frame may be configurable to have the same bandwidth as a subchannel. The bandwidth of a subchannel may be 20 MHz, 40 MHz, or 80 MHz, 160 MHz, 320 MHz contiguous bandwidths or an 80+80 MHz (160 MHz) non-contiguous bandwidth. In some examples, the bandwidth of a subchannel may be 1 MHz, 1.25 MHz, 2.03 MHz, 2.5 MHz, 5 MHz and 10 MHz, or a combination thereof or another bandwidth that is less or equal to the available bandwidth may also be used. In some examples the bandwidth of the subchannels may be based on a number of active subcarriers. In some examples the bandwidth of the subchannels are multiples of 26 (e.g., 26, 52, 104, etc.) active subcarriers or tones that are spaced by 20 MHz. In some examples the bandwidth of the subchannels is 256 tones spaced by 20 MHz. In some examples the subchannels are multiple of 26 tones or a multiple of 20 MHz. In some examples a 20 MHz subchannel may comprise 256 tones for a 256 point Fast Fourier Transform (FFT).

A HEW frame may be configured for transmitting a number of spatial streams, which may be in accordance with MU-MIMO. In some examples a HEW frame may be configured for transmitting streams in accordance with antenna structures described herein and operated as one or more arrays or antenna structure(s) to generate Orbital Angular Momentum (OAM) beams of various OAM modes. In accordance with some IEEE 802.11-family examples, a controlling station 102 may operate as a controlling station which may be arranged to contend for a wireless medium (e.g., during a contention period) to receive exclusive control of the medium for an HEW control period. In some examples, the HEW control period may be termed a transmission opportunity (TXOP). The controlling station 102 may transmit a HEW controlling-sync transmission, which may be a trigger frame or HEW control and schedule transmission, at the beginning of the HEW control period. The controlling station 102 may transmit a time duration of the TXOP and sub-channel information. During the HEW control period, HEW STAs 104 may communicate with the controlling station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the controlling station 102 may communicate with HEW stations 104 using one or more HEW frames. During the HEW control period, the HEW STAs 104 may operate on a sub-channel smaller than the operating range of the controlling station 102. During the HEW control period, legacy stations refrain from communicating. In other examples the HEW STAs 104 may communicate with the controlling station 102 in accordance with an antenna array or structure(s) of the types discussed below for generating Orbital Angular Momentum (OAM) beams of various OAM modes. This may be full multiplexing where n data streams are mapped to n OAM modes; or fewer than n data streams are mapped to n OAM modes for partial diversity and partial multiplexing; or one data stream may be mapped to n OAM modes for full diversity, depending on channel conditions and the objectives of the system as discussed more fully below.

The controlling station 102 may also communicate with legacy stations 106 and/or HEW stations 104 in accordance with legacy IEEE 802.11 communication techniques. In some examples, the controlling station 102 may also be configurable to communicate with HEW stations 104 outside the HEW control period in accordance with legacy IEEE 802.11 communication techniques, although this is not a requirement.

Figure 2:
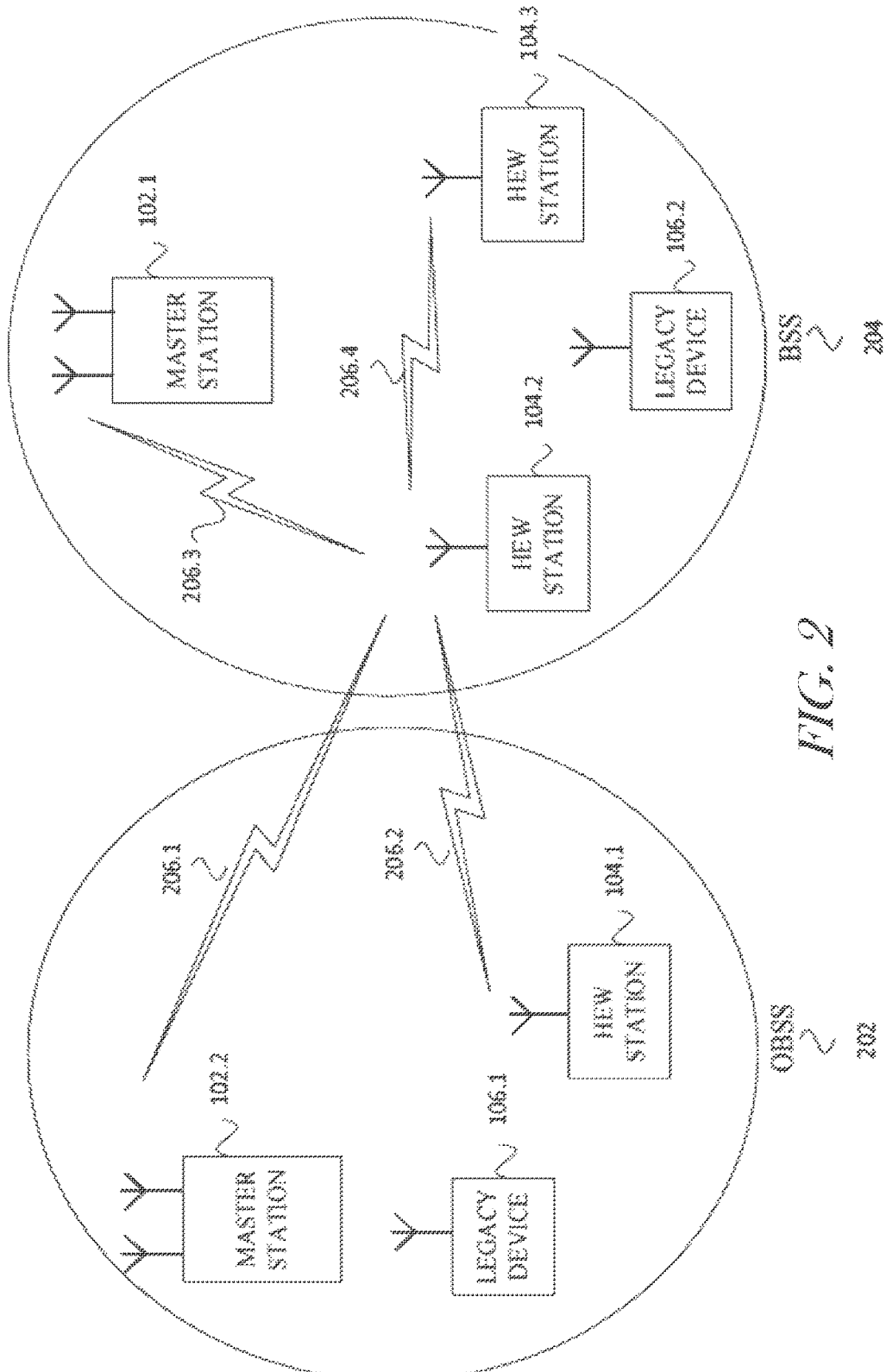
FIG. 2 illustrates a basic service set (BSS) and an overlapping basic service set (OBSS) in accordance with some aspects.

FIG. 2 illustrates a basic service set (BSS) 204 and an overlapping basic service set (OBSS) 202 in accordance with some examples. Illustrated in FIG. 2 are an OBSS 202 and BSS 204. The OBSS 202 includes one or more controlling stations 102, one or more HEW stations 104, and one or more legacy devices 108. The HEW station 104.1 and legacy device 106.1 are associated with the controlling station 102.2. The controlling station 102.2 has an identification (not illustrated) for the OBSS 202, which may be termed a BSS identification (BSSID). In some examples, the identification is termed the color of the OBSS 202. The HEW station 104.1 stores a MAC address (see FIGS. 3, 4, and 5) of the controlling station 102.2. The OBSS 202 is a BSS 100. The OBSS 202 is termed an OBSS 202 to BSS 204 because some of the signals 206 overlap with the BSS 204.

The BSS 204 includes one or more controlling stations 102, one or more HEW stations 104.2, 104.3, and one or more legacy devices 106.2. The HEW stations 104.2 and 104.3 and legacy device 106.1 are associated with the controlling station 102.1. The controlling station 102.1 has an identification (not illustrated) for the BSS 204, which may be termed a BSSID. In some examples, the identification is termed the color of the BSS 204. The HEW stations 104.2 and 104.3 store a MAC address (see FIGS. 3, 4, and 5) of the controlling station 102.1.

Signal 206.1 is transmitted from the controlling station 102.2 and received by HEW station 104.2. Signal 206.2 is transmitted from HEW station 104.1 and received by HEW station 104.2. Signal 206.4 is transmitted from the HEW station 104.3 and received by HEW station 104.2. Signal 206.3 is transmitted by controlling station 102.1 and received by HEW station 104.2. The signals 206 may be packets transmitted by a controlling station 102, HEW station 104, legacy device 106, and/or another wireless device (not illustrated).

In some examples the HEW station 104 and/or controlling station 102 are configured to determine whether or not to use spatial re-use based on whether a signal 206 is from an OBSS 202 or BSS 204. The HEW station 104 determines whether the detected frame is an inter-BSS (OBSS 204, signals 206.1 and 206.2) or intra-BSS frame (BSS 204, signals 206.3 and 206.4) by using BSS color, which may be indicated in a physical header (e.g., SIG-A) or MAC address in the MAC header. If the detected frame is an inter BSS frame, under predetermined conditions, the HEW station 104 uses a predetermined a power detect level of the OBSS 202 that is greater than the minimum receive sensitivity level to determine whether or not the HEW station 104 may perform an action such as spatially reuse the resource the frame is using.

Figure 3:
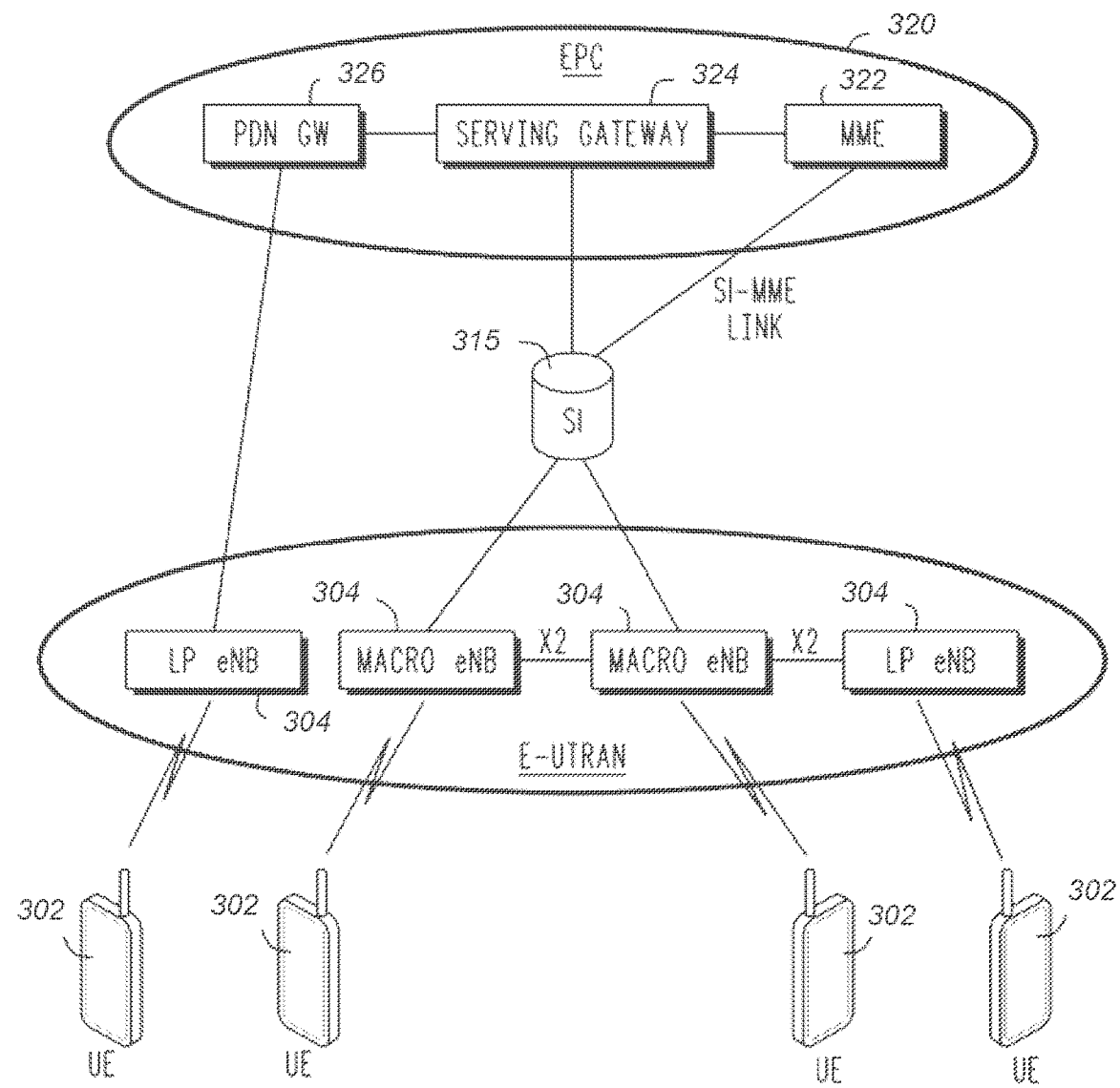
FIG. 3 is a functional diagram of a 3GPP network in accordance with some aspects.

FIG. 3 is a functional diagram of a 3GPP network in accordance with some examples. The network comprises a radio access network (RAN) (e.g., as depicted, the E-UTRAN or evolved universal terrestrial radio access network) 301 and the core network 320 (e.g., shown as an evolved packet core (EPC)) coupled together through an S1 interface 315. For convenience and brevity sake, only a portion of the core network 320, as well as the RAN 301, is shown.

The core network 320 includes a mobility management entity (MME) 322, a serving gateway (serving GW) 324, and packet data network gateway (PDN GW) 326. The RAN 301 includes Evolved Node-B's (eNB) 304 (which may operate as base stations) for communicating with User Equipment (UE) 302. Hereinafter, the terms eNB and base station (BS) may be used interchangeably unless a specific distinction is intended, in which case the distinction will be specifically pointed out. The eNBs 304 may include macro eNBs and low power (LP) eNBs. In accordance with some examples, the eNB 304 may transmit a downlink control message to the UE 302 to indicate an allocation of physical uplink control channel (PUCCH) channel resources. The UE 302 may receive the downlink control message from the eNB 304, and may transmit an uplink control message to the eNB 304 in at least a portion of the PUCCH channel resources. These examples will be described in more detail below.

The MME 322 is similar in function to the control plane of legacy Serving GPRS Support Nodes (SGSN). The MME 322 manages mobility aspects in access such as gateway selection and tracking area list management. The serving GW 324 terminates the interface toward the RAN 301, and routes data packets between the RAN 301 and the core network 320. In addition, it may be a local mobility anchor point for inter-eNB handoffs and also may provide an anchor for inter-3GPP mobility. Other responsibilities may include lawful intercept, charging, and some policy enforcement. The serving GW 324 and the MME 322 may be implemented in one physical node or separate physical nodes. The PDN GW 326 terminates a SGi interface toward the packet data network (PDN). The PDN GW 326 routes data packets between the EPC 320 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 326 and the serving GW 324 may be implemented in one physical node or separated physical nodes.

The eNB 304 (macro and micro) terminate the air interface protocol and may be the first point of contact for a UE 302. In some examples, an eNB 304 may fulfill various logical functions for the RAN 301 including but not limited to RNC (radio network controller functions) such as radio bearer management, uplink and downlink dynamic radio resource management and data packet scheduling, and mobility management. In accordance with examples, UE 302 may be configured to communicate with an eNB 304 over a multipath fading channel in accordance with an Orthogonal Frequency Division Multiple Access (OFDMA) communication technique. The OFDM signals may comprise a plurality of orthogonal subcarriers.

The S1 interface 315 is the interface that separates the RAN 301 and the EPC 320. It is split into two parts: the S1-U, which carries traffic data between the eNB 304 and the serving GW 324, and the S1-MME, which is a signaling interface between the eNB 304 and the MME 322. The X2 interface is the interface between eNB 304. The X2 interface comprises two parts, the X2-C and X2-U. The X2-C is the control plane interface between the eNB 304, while the X2-U is the user plane interface between the eNB 304.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 326. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some examples, the UEs or eNBs of an LTE system may include antenna structures operated as one or more arrays to generate Orbital Angular Momentum OAM beams of varying OAM modes.

Traditional wireless networks use a variety of techniques to maximize channel capacity between the transmitter and receiver. Such methods include beamforming, antenna diversity, traditional MIMO or carrier aggregation. As discussed briefly above, wireless networks of today provide acceptable bandwidth in many usage scenarios. However, there will be an exponentially increased demand for higher bandwidth in the future, as more people access even more data intensive real-time applications using their wireless devices. Such data intensive applications of the future may utilize backhaul, WAN, LAN, and PAN networks that can support wireless links that are 10×-1000× faster than today's links. These needs can be achieved, at least in part, by the use of OAM wave beams to increase channel capacity. Discussed below is a method to implement OAM in a millimeter wave wireless communication system. OAM has been discussed previously in the context of free space optics but its application and implementation for millimeter-wave wireless systems as proposed herein is new. In one example OAM can be used to augment currently existing short range high throughput wireless systems such as WiGig.

Orbital angular momentum (OAM) multiplexing has been proposed for improving the spectral efficiency of radio transmissions by utilizing a helicoidally-distributed phase profile of an electromagnetic wave in the plane orthogonal to the propagation axis. Cross-mode orthogonality of OAM waves has been shown to provide a new dimension space for data multiplexing. Shaped antenna reflectors or lenses and circular phased arrays have been proposed to generate different OAM wave modes.

OAM communication pertains to using multiple phasing of a signal that are transmitted and received with a specially-arranged array of antennas to create multiple spatial modes of transmission that enable transmission of multiple data streams, simultaneously, which are individually discernable by an OAM receiver. The signals carrying different data streams may be orthogonal to one another in some examples. In other examples, the OAM signals may be not strictly orthogonal, provided that they are discernable to an extent that they provide an increase in spatial dimension, or rank, in the communication system. An example use case for the latter type of example is multiple input/multiple output (MIMO) communication.

In general, optimum performance of OAM MIMO is achieved under different propagation conditions than traditional MIMO. While traditional MIMO thrives in multipath-rich channels, OAM MIMO thrives in line-of-sight (LoS) environments with poor multi-path reflections such as mm-wave channels. In LoS environments, multiple OAM modes provide the multiple independent channels according to MIMO operation along the same axis with minimal cross-mode interference.

Challenges remain with the practical application of these techniques. For instance, OAM techniques have thus far involved dedicated antennas or arrays for each mode, making the antenna structure extremely complex for multi-mode transmission/reception. Moreover, OAM waves have thus far been limited for point-to-point communication in a fixed and precise direction, perpendicular to the antenna aperture plane due to the recognized constraint that cross-mode orthogonality holds only in the single direction of the beam axis.

Some examples are directed to creating an OAM system for generating and propagating multiple streams of data. The streams are transmitted using different OAM mode orders and, when generated, may be electromagnetically orthogonal to each other, or otherwise individually discernable by a receiver. The transmitted OAM beams are propagated along the same axis, yet do not irretrievably interfere with each other. Consequently, the receiver merely has to detect each mode and demodulate its data contents.

OAM may be used to great advantage for millimeter-wave and high frequency systems where it is difficult to obtain multiple-stream transmission. Consequently, OAM offers a way of creating MIMO transmission for high frequency channels.

OAM has been used in research for fiber optics and for optical components using laser beams, where data can be transmitted via multiple modes propagated along the axis of a single laser beam. OAM also been discussed for lower frequencies in the literature. However, in the literature realistic wireless implementations have not been discussed. For example, in the literature people have tried to explore generating OAM beams using antenna systems. However, in those implementations the antenna system has been used to generate one OAM mode at a time. But in order to obtain the channel capacity gains that are required, there is a need to be able to generate multiple orthogonal modes at the same time along the same propagation path and/or along the same propagation environment.

As discussed above, OAM was used in optical frequency communication. But the described example uses OAM for millimeter wave frequencies as well. In optics, it is easier to generate OAM modes because the transmitter and receiver apertures respectively are electrically large (i.e., thousands of times larger than the optical wavelength) thus making it easier to generate OAM modes. In the millimeter wave regime, it is difficult to generate these modes given the much smaller electrical size of the transmitter and receiver antenna apertures, and given that spatial light modulator (SLM) dielectrics would be too large and bulky to use (vis-à-vis their use in optical applications). Another challenge of OAM implementation is the generation and detection of multiple modes simultaneously, from the antenna system to the baseband/DSP both at the transmitter and at the receiver.

Disclosed is a method, system and article of manufacture that addresses the implementation of a wireless communication system to generate multiple OAM beams at radio frequencies. Using multiple OAM beams can augment the available wireless channel capacity in a RF system. Further, OAM enables a higher channel capacity because it adds an additional layer of modulation to a wireless communication system, by utilizing spatial multiplexing to create and receive orthogonal electromagnetic (EM) field radiation (i.e., OAM modes) at the transmitter and receiver, respectively. Consequently, a single physical channel may be used to obtain a channel capacity that is a multiple of the number of OAM modes that may be reliably generated and received. Theoretically, there is no limit to the number of modes that may be used; practically, the number of modes is expected to be limited in specific examples to limit the size and complexity of antenna arrays, RF circuitry, and processing circuitry.

In OAM, a wave front propagates with helical phase fronts with $2\pi m$ phase shifts, with m being an integer that represents the mode order. Various research works have demonstrated that OAM beams of different orders are orthogonal and therefore, ideally, do not interfere with each other. This means that an OAM beam of order m=0, for instance, does not interact with any other OAM mode order even with all modes propagating along the same axis within the same physical "free space" channel at essentially the same time. In reality, however, due to engineering limitations and channel impairments, OAM modes may experience crosstalk due to mode generation artifacts as well as channel multipath and reflection effects. In spite of these non-idealities, OAM is an excellent candidate transmission technology for high throughput data links in which there is LoS between the transmitter and receiver, particularly short range communications like WiGig.

OAM is also favored in multipath-poor LoS scenarios because the mode crosstalk is minimal in which case and channel capacity is multiplied compared to a traditional spatially-multiplexed line of sight link (e.g., conventional MIMO).

Figure 4:
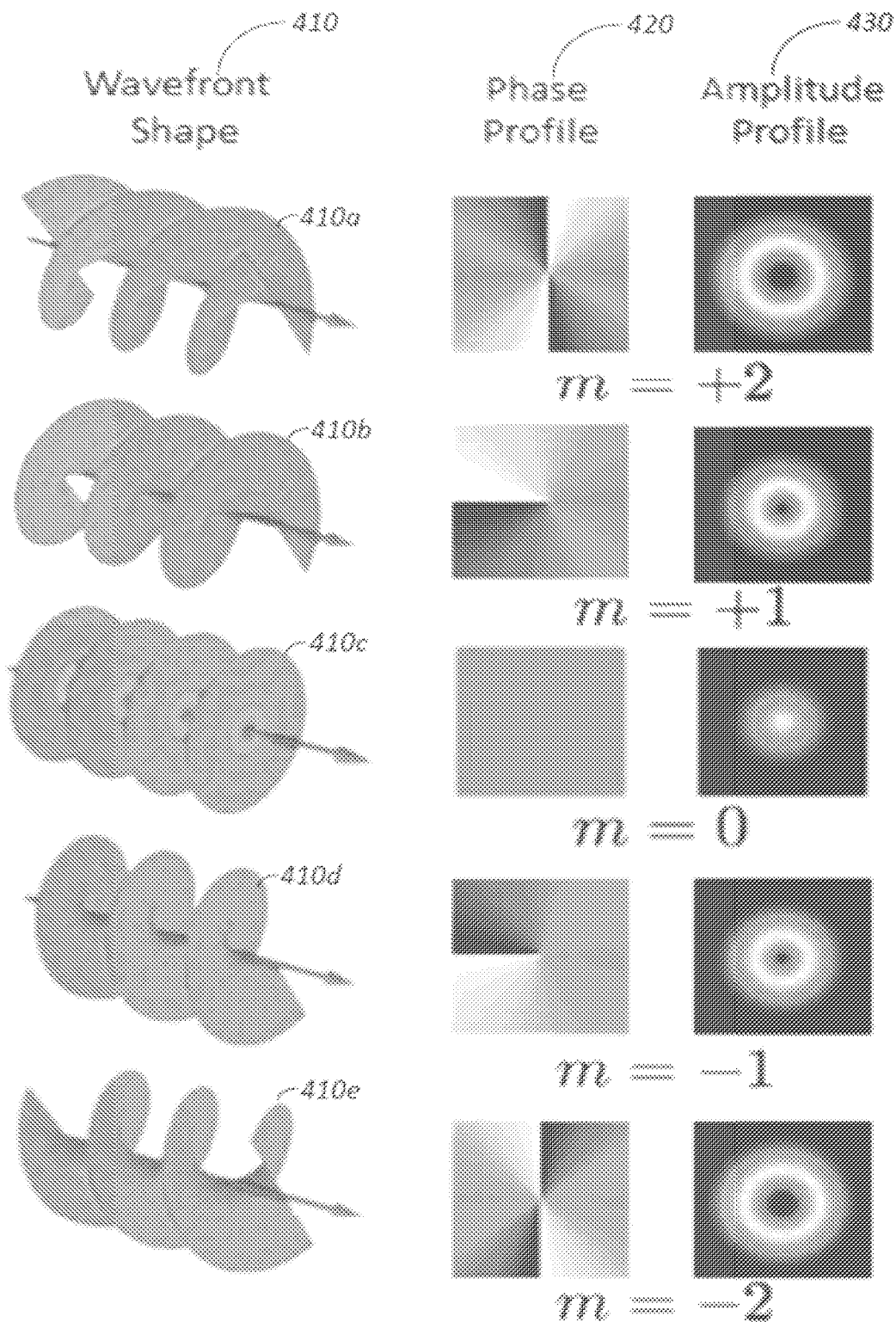
FIG. 4 illustrates several OAM modes in accordance with some aspects.

FIG. 4 illustrates several OAM modes, in accordance with some examples. The left column 410 depicts OAM modes 410a, 410b, . . . , 410e propagating in free space. The spiral propagation pattern of wavefronts can be observed. The middle column 420 illustrates the phase profile of a planar cross section of the wavefront for each mode. The right column 430 shows the amplitude profile for each of the propagating OAM wavefronts for each mode. To generate and receive OAM modes in wireless communication an appropriate radio system communication architecture would address OAM antenna topology, mode generation/reception topology and multi-OAM signaling. OAM communication system architecture is both similar to and different from a conventional wireless communication system. Like a conventional wireless communication system, an OAM communication system comprises traditional system blocks such as the baseband components for digital signal processing, RF front end components comprising RF elements such as filters, amplifiers, local oscillators, mixers, and other components, and the antenna system. This is discussed in more detail below.

The method of implementation of the OAM system determines the system architecture, depending on the OAM mode transmission technique. The OAM communication system may be used to transmit separate data streams across different OAM modes, or to transmit one single data stream across multiple modes in order to provide space diversity to mitigate a fading channel caused by multipath issues. Further, the system may be adaptable to a configuration in between these two transmission types. In one example, n data streams could be mapped to in modes, which may be referred to as full multiplexing. In another example, fewer than n data streams could be mapped to n OAM modes, providing partial diversity and partial multiplexing. In yet another example one data stream could be mapped to n modes, which may be referred to as full diversity.

Multiplexing fewer streams to a higher number of modes will help improve mode separation through DSP, and is recommended when reliability is more important than throughput. Multiplexing the same number of streams to the same number of modes is a way of creating orthogonal diversity paths, and will be typically used when higher data rates are the priority. In general, OAM system architecture can be designed to allow one or more data signals to be multiplexed to one or more modes, ranging from full spatial multiplexing to diversity transmission. For easier demodulation and lower design complexity at the receiver, the transmitter can signal to the receiver how many data streams were multiplexed. In addition, the receiver can feed back demodulation quality information (through bit error rate (BER), for instance) so that transmitter can adapt the multiplexing order. The receiver can also feed back to the transmitter a recommendation of how many multiplexing streams to transmit since it has knowledge of the quality of all the OAM modes it receives.

Figure 5:
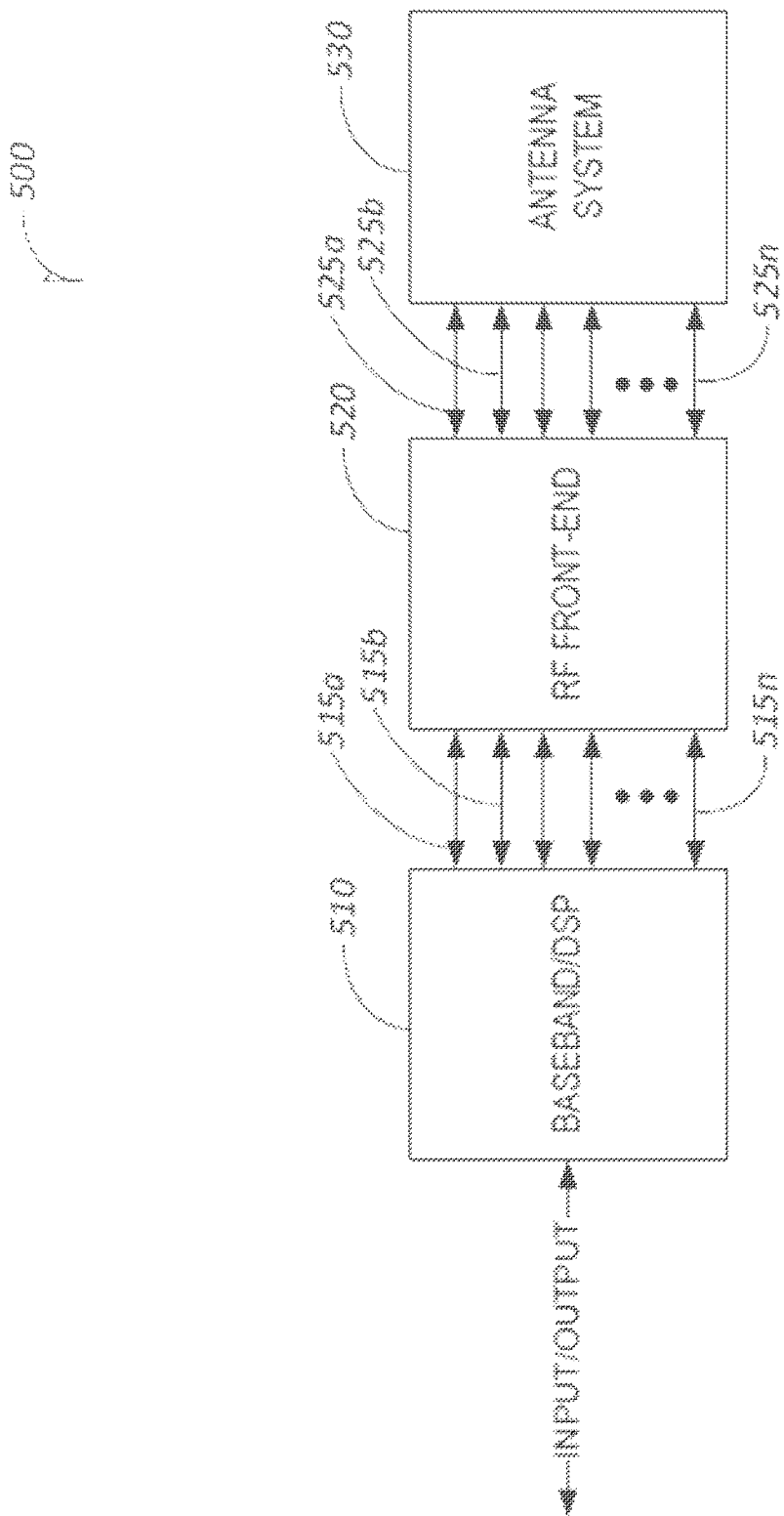
FIG. 5 illustrates a high-level system block diagram representation of an OAM system for transmitting/receiving separate data streams across one or more modes in accordance with some aspects.

FIG. 5 illustrates a high level system block diagram representation of an OAM transceiver 500 for transmitting/receiving separate data streams across one or more modes in accordance with some examples. System 500 comprises baseband/DSP component 510, RF front end 520 and antenna system 530. The system has it data paths 515a, 515b, . . . , 515n for n RF chains between baseband/DSP component 510 and the RF front end 520. There are also the same number, n, of data paths 525a, 525b, . . . , 525n between RF front end 520 and antenna system 530. Multiple data stream multiplexing across one or more multiple OAM modes is illustrated in FIG. 5. The system would, as is usual, include a digital to analog converter (DAC), not shown for space-saving reasons, for each data path connection in the baseband/DAP component 510. For full multiplexing, several RF chains are needed to generate and curate the independent data streams. For transmit/receive flexibility this configuration of n data paths 515a, 515b, . . . , 515n and 525a, 525b, . . . , 525n is used in FIG. 5 for full multiplexing capability, even if a full diversity OAM configuration (one data stream mapped to n modes) were used at times. In other words, because the system should be able to handle full multiplexing with n data streams mapped to n modes, the system architecture would include capability for n RF chains even though channel conditions may suggest the need for partial diversity or full diversity from time to time.

Multiple RF chains may be implemented in one single RF IC, regardless of the number of RF chains for example as the RF front end 520. The output of the RF front end 520 will be passed to the baseband/DSP block 510 for signal processing. The antenna system block 530 in FIG. 5 may be implemented using an antenna or antennas that can independently generate separate OAM beams to transmit/receive the separate data streams. As discussed above, the environment may distort the mode structures, because of non-ideal conditions that induce crosstalk among otherwise orthogonal modes. The DSP portion of component 510 would utilize standard signal processing techniques to remove the crosstalk between the digital signal streams recovered from the separate OAM modes. For example, the system would, as is usual, include a Digital to Analog Converter (DAC), not shown, for each RF chain in the baseband/DAP component 510. This DSP function of component 510 would be utilized to maximize the channel capacity across the different modes, in view of the fact that the different OAM modes would have been affected differently by the environment.

Figure 6:
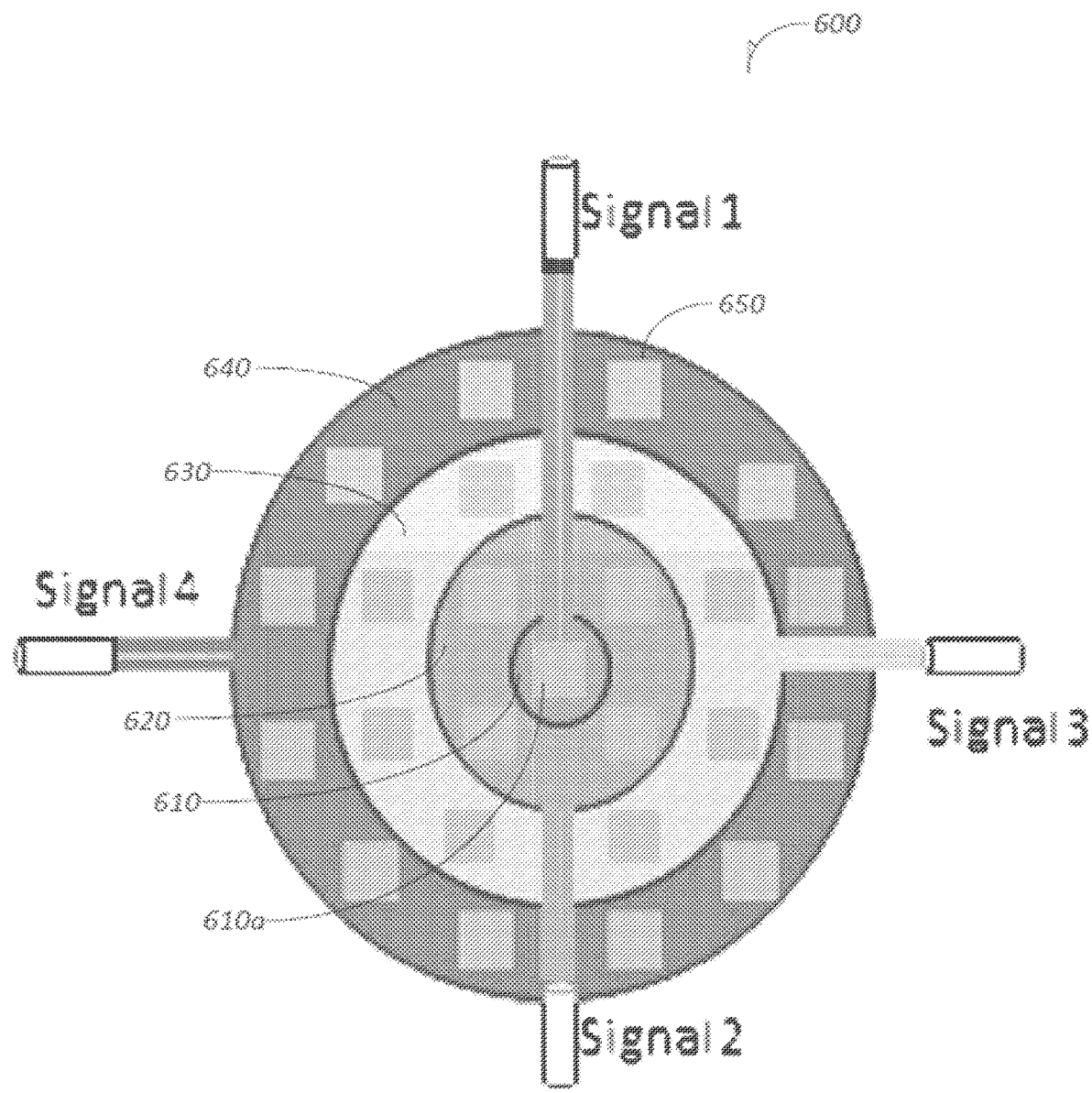
FIG. 6 illustrates a concentric antenna array to generate four OAM modes using patch antenna elements in accordance with some aspects.

FIG. 6 illustrates an example of concentric antenna array to generate four OAM modes using patch antenna elements in accordance with some examples. The illustrated antenna example may use a concentric ellipsoid or other arrangement (e.g., rings) of circular antenna arrays to generate separate OAM modes. In this example, each concentric antenna array arrangement generates a different mode, with the total number of modes desired dictating the number of rings used. Each of the concentric rings 610, 620, 630, 640 could be made of any type of antenna element. The squares, such as square 650, represent square patch antennas. However, circular or other geometries of patch antennas may be used. Further, patch antennas are not a requirement as any type of antenna that behaves as discussed below can be used. Furthermore, some examples may use other than concentric rings of antennas.

Moreover, other antenna structures, including three-dimensional arrangements, such as cone shapes, convex hemispherical or parabolic shapes, concave hemispherical or parabolic shapes, and the like, may be utilized. In addition, the antenna array may be varied in scale and frequency band of use. For instance, the antenna array may be sized for use with mmWave communications in the 30-100 GHz bands. In other examples, the antenna array may be sized to work with the 2.4-6 GHz bands.

In the example depicted in FIG. 6, each antenna ring 610, 620, 630, 640 can be used to generate an independent OAM mode by stimulating each antenna element with a slightly different phase profile so that the total circumferential phase profile is $2\pi m$, where m represents the mode order that is being generated. Higher order modes are best generated on the outer antenna array rings. In FIG. 6 the first antenna ring 610 comprises the center antenna element illustrated as a single square patch antenna 610a. The second antenna ring is the four antenna array in circle 620. The third antenna ring is at 630 and comprises eight antennas. The fourth antenna ring 640 comprises twelve antennas. More or fewer antennas may be used per ring so long as the phase excitation of the antennas described below is maintained. It is desirable to use as many antenna elements as possible to generate each mode. However, the maximum number of antenna elements is determined by the perimeter of the array ring. A larger array ring perimeter reduces the mode path loss of whichever modes are being transmitted.

OAM modes range from 0 to ±∞. In practice, higher-order modes have very large divergence and thus experience high attenuation. Therefore, it is typically the first mode order (m=0, traditional plane wave) and the next few modes (±1 to a finite number) that are valuable for improved transmission. Positive mode orders and negative mode orders are qualitatively similar. The difference between positive and negative mode orders is that positive mode orders have a clockwise phase rotation while negative mode orders have a counterclockwise phase rotation. To generate an OAM mode for any of the concentric patch antenna array rings of FIG. 6, a phase shift of 2πm radians divided by the number of antenna elements is applied. For example, the m=+1 (or m=−1) OAM mode would be generated by the ring 620 comprising four patch antenna elements (indicated by the four squares in ring 620). The phase difference between each of the four antenna elements would be +2π/4 radians, i.e., +π/2 radians (or −π/2 radians for m=−1 mode order). The next ring 630, comprising eight elements, would generate the m=+2 (or m=−2) mode, thus the phase difference between each element would also be +π/2 radians (or −π/2 radians for m=−2). To generate the m=3 mode the outer most ring, with twelve elements, would also have a phase separation of +π/2 radians (or −π/2 radians for m=−3) between elements. The m=0 OAM mode is a traditional plane wave mode in the far field, and this would be generated by the innermost antenna 610a. In general, a respective concentric ring of antenna elements may be energized with a respective signal having a continuously varying progressive phase between the antenna elements. The phase difference between antenna elements in a concentric ring of a antenna elements is 2πm/α where m is the OAM mode generated by the concentric ring.

As discussed above, inventive aspects are not limited to concentric arrays. Any antenna system that can generate and receive OAM modes (e.g., any antenna structure(s) that can be used to generate helical phase fronts) may be used. For example, another example may comprise a large square array, which may be a 16 by 16 antenna array, or even a rectangular array. In other words, an alternate example could be an antenna structure other than a circular array so long as the structure can be made to take on, in operation, a circular arrangement of antenna elements. The phase across the circular arrangement would be modified in order to generate each mode along each circumference. Stated another way, if one drew several imaginary concentric circles of different radius on the surface of the square array under discussion, all the antenna elements that a first circle intersects or includes would be the antennas that would generate a specific mode along that first circle. Then, the antennas that a second circle intersects would be the antennas that generate a second mode. One can do that repeatedly for different circles of different radii to generate different OAM modes. In other words, one could essentially operate a standard 16 by 16 array in the same manner in which one operates the circular array of FIG. 6.

Figure 7A:
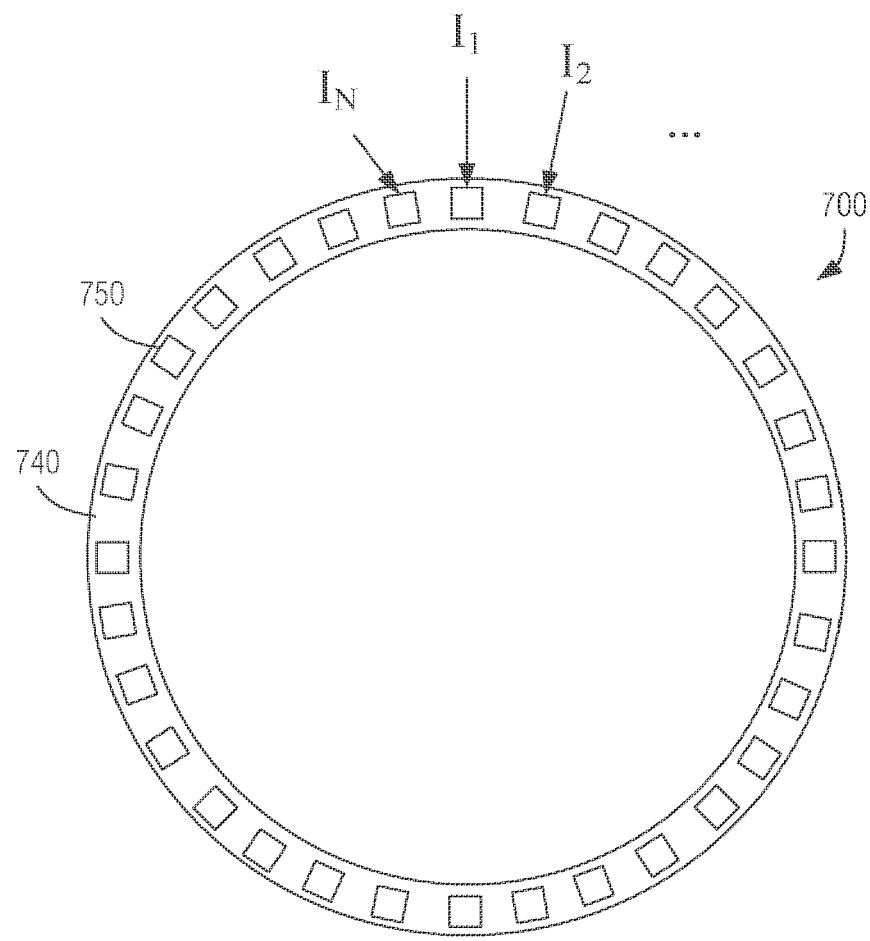
FIG. 7A is a diagram illustrating a phased-array antenna arrangement having an elliptical (e.g., circular) antenna array ring of patch antenna elements according to some aspects.

FIG. 7A is a diagram illustrating a phased-array antenna arrangement 700 according to some examples having an elliptical (e.g., circular) antenna array ring 740 of patch antenna elements 750. As discussed above, the patch antenna elements may have any suitable shape, be it square, round, polygonal, irregular, compound (e.g., composed of multiple sub-elements) etc. Notably, this single array may be used to transmit and receive multiple OAM modes, as will be described in greater detail below.

Antenna element excitation signals, which are based on antenna element-specific signals $I_1, I_2, \ldots, I_N$, described in greater detail below, are supplied to respective individual patch antenna elements 750. Using antenna arrangement 700, multiple OAM modes may be generated electronically, rather than by the antenna structure.

Figure 7B:
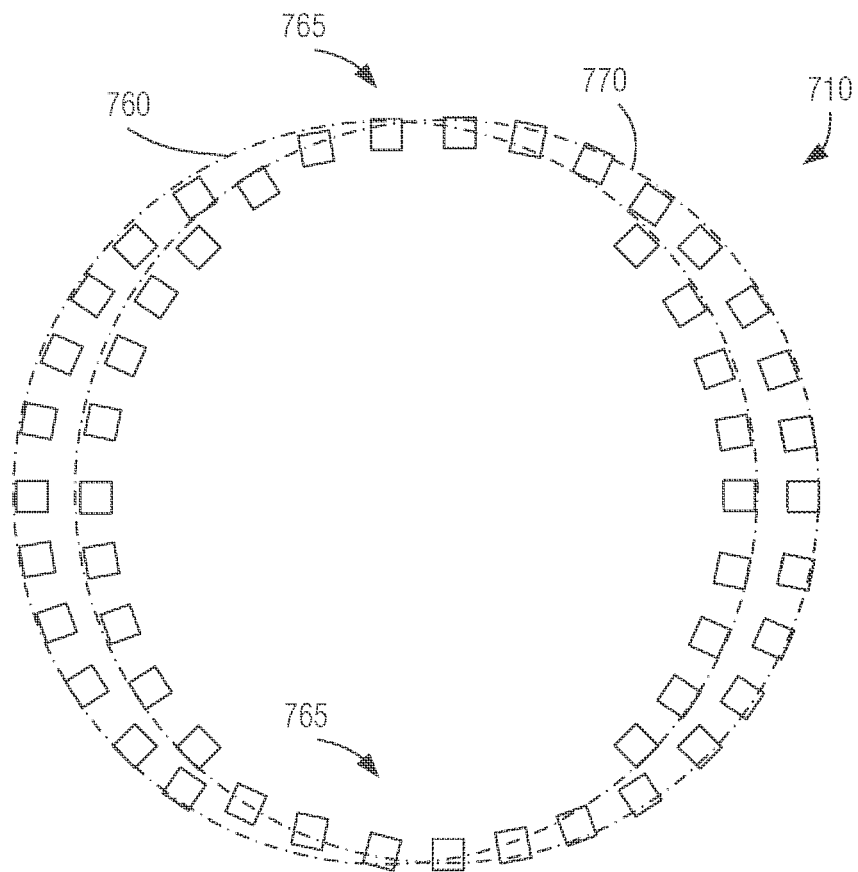
FIG. 7B is a diagram illustrating a phased-array antenna arrangement that includes a plurality of selectable sets of antenna elements according to some aspects.

FIG. 7B is a diagram illustrating a phased-array antenna arrangement 710 that includes a plurality of selectable sets 760, 770 of antenna elements according to some examples. Each set 760, 770 may have a similar, though not necessarily absolutely identical, arrangement of antenna elements, though sets 760, 770 may be positioned differently. In the example depicted, sets 760 and 770 are each generally circular in their respective arrangements. Notably, certain individual antenna elements may be shared among the sets. For instance, antenna elements 765 are common among sets 760 and 770. In some examples, selectable sets 760, 770 of antenna elements are switchably selectable. Moreover, in the example depicted, the selectable sets 760, 770 are not concentric; rather, they are offset along a lateral direction as shown.

Figure 7C:
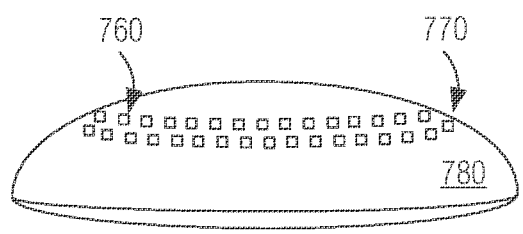
FIG. 7C is a diagram illustrating antenna-element sets that are situated on a non-flat structure, such as a convex bowl-shaped surface according to some aspects.

FIG. 7C is a diagram illustrating a related example, in which antenna-element sets 760 and 770 are situated on a non-flat structure which, in this example, has a convex bowl shaped surface 780. As will be described in greater detail below, switching between antenna element sets 760 and 770 may facilitate varying the beam direction of OAM waves emitted or received by antenna arrangement 710.

In related examples, a greater plurality of selectable sets than shown in FIGS. 7B-7C may be utilized. For instance, an antenna array may include 3, 4, 5, or more non-concentric selectable sets, which may be offset from one another along more than one lateral direction.

Figure 8:
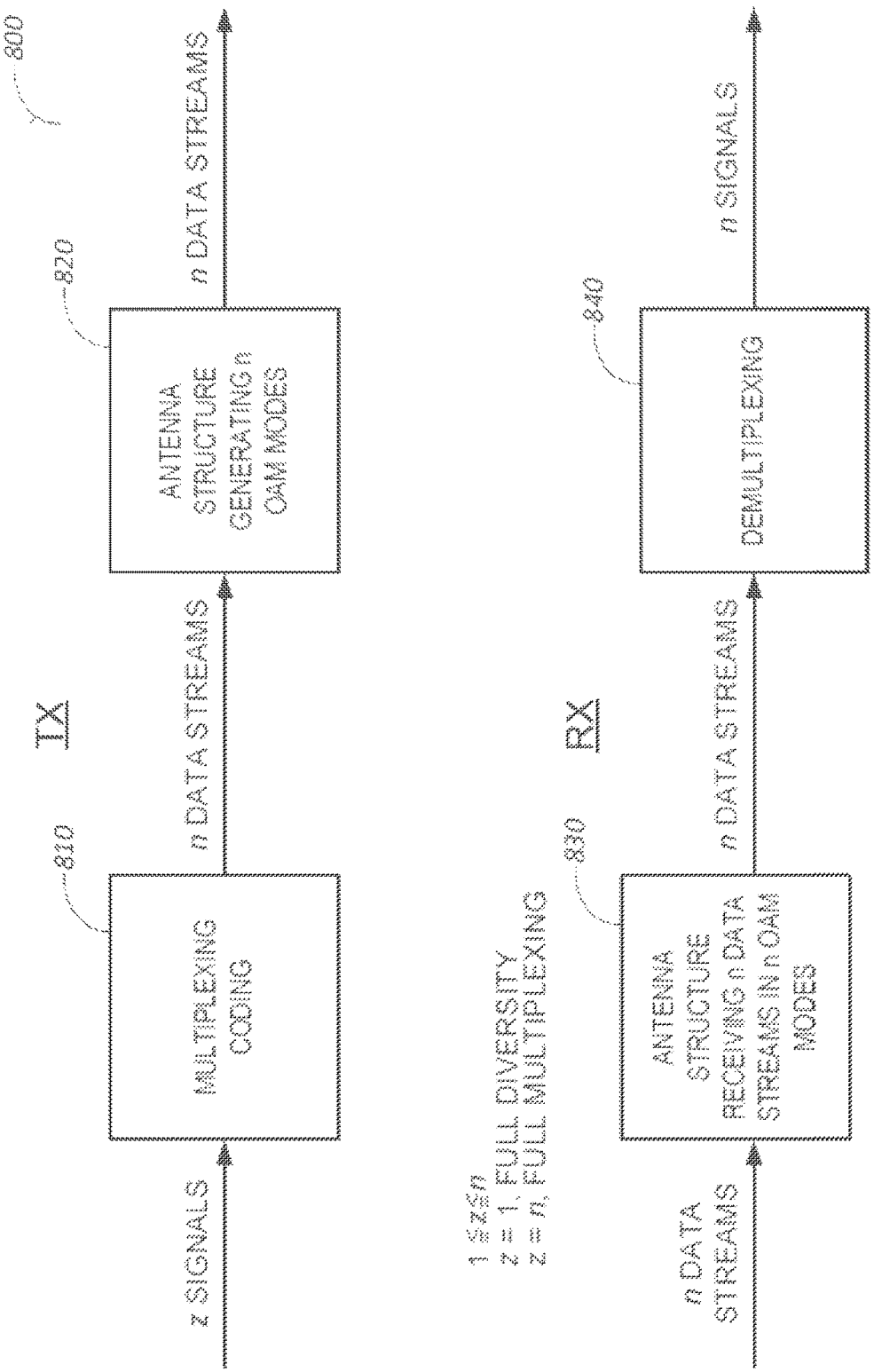
FIG. 8 is a flowchart illustrating dataflow in accordance with some aspects.

Turning back to examples where the antenna structure (e.g., as illustrated in FIG. 6) generates the OAM modes, FIG. 8 is a flowchart illustrating dataflow in accordance with these examples. In FIG. 8 dataflow 800 shows the relationship of data streams at the transmitter TX and at the receiver RX. At transmitter TX there are z signals into the multiplexing coding function 810. n data streams exit multiplex coding function 810 and are presented to antenna structure 820 for generating n OAM modes for the transmission of n data streams in n OAM beams exiting antenna structure 820. These n data streams represent in RF chains and may be in full multiplexing where n data streams each with different data content are mapped to n OAM modes; or full diversity where n data streams each with the same data content are mapped to n OAM modes. Further, these in streams may be in partial diversity and partial multiplexing where x of n data streams have the same data content and y of the n data streams each have different data content, where x+y=n. In any case, the n data streams are mapped to n OAM modes for transmission. This is seen in the equation chart of FIG. 8 where z represents the data content of the z signal input to multiplexing coding function 810. The quantity z ranges from 1 to n. If z=1, representing n data streams each with the same data content (the z signals each comprise the same data content), transmission is at full diversity. If z=n, (the z signals each comprise different data content), the transmission is at full multiplexing. If z is between 1 and n then r of the z signals comprise the same data content and y of the z signals comprise different data content and the transmission is at partial diversity and partial multiplexing, where x+y=z.

At the receiver, RX, of FIG. 8, the n data streams are received at antenna structure 830 which receives the n data streams in it OAM modes. The it data streams are demultiplexed at demultiplexing function 840 which provides as output n signals that were input to multiplexing coding function 810. Again the data content of the output of n signals may be each the same data content if the transmission was at full diversity (z=1), each of different data content if the transmission was at full multiplexing (z=n), or x data signals of the same content and y data signals of different content, where x+y=n, for partial diversity and partial multiplexing.

A related aspect is directed to a multi-input transmitter, in which multiple channels are simultaneously multiplexed and transmitted using multiple OAM modes. In some examples, these transmissions may be electronically controlled to be steered in a desired direction. In an example, the transmit antenna is a circular array of antenna elements, as described above with reference to FIG. 7.

In an example, channelization and rotation are achieved through phasing and combining of inputs over the same bandwidth using rotated OAM multiplexing. The rotated OAM multiplexing may be orthogonal according to various examples. In practical examples, orthogonality will be understood to include insignificant non-idealities due to such factors as variations in manufacturing or variations in electronic componentry, thermal non-uniformities, etc. More generally, OAM multiplexing within the present context is intended to encompass orbital angular momentum-based multiplexing that produces individually-discernable signals. Phasing may be achieved by using controllable phase shifters in the RF domain (e.g., RF chains). Alternately or additionally, OAM phasing may be achieved using an IFFT block in the baseband according to some examples.

Reception and de-multiplexing is achieved through the reverse process of the same. Multiple channels are simultaneously received and de-multiplexed from an electronically-controllable desired direction. The reception antenna may also be a circular (ring) array of antenna elements followed by rotation phasing, splitting and OAM decomposition phasing. Alternately or additionally, OAM modes may be composed/decomposed in the transmitter/receiver baseband using an IFFT/FFT block according to some examples.

Advantageously, such examples may address some of the challenges discussed above using a phasing mechanism to simultaneously transmit/receive multiple orthogonal mode channels over a communicating pair of circular antenna arrays, and steer the beam to off-axis directions.

Referring briefly to the antenna array of FIG. 7, circularly uniform amplitude aperture current distribution as below produces OAM waves:

$$I_m(\varphi) = Ae^{-j\Phi(\varphi)} 0 \le \varphi < 2\pi$$

$$\Phi(\varphi) = m\varphi$$

$$m = 0, \pm 1, \pm 2, \ldots \text{ any integer}$$

Different values of m result in different modes of OAM waves that are orthogonal to one-another as they propagate along the direction of the beam axis, perpendicular to the aperture plane.

Figure 9A:
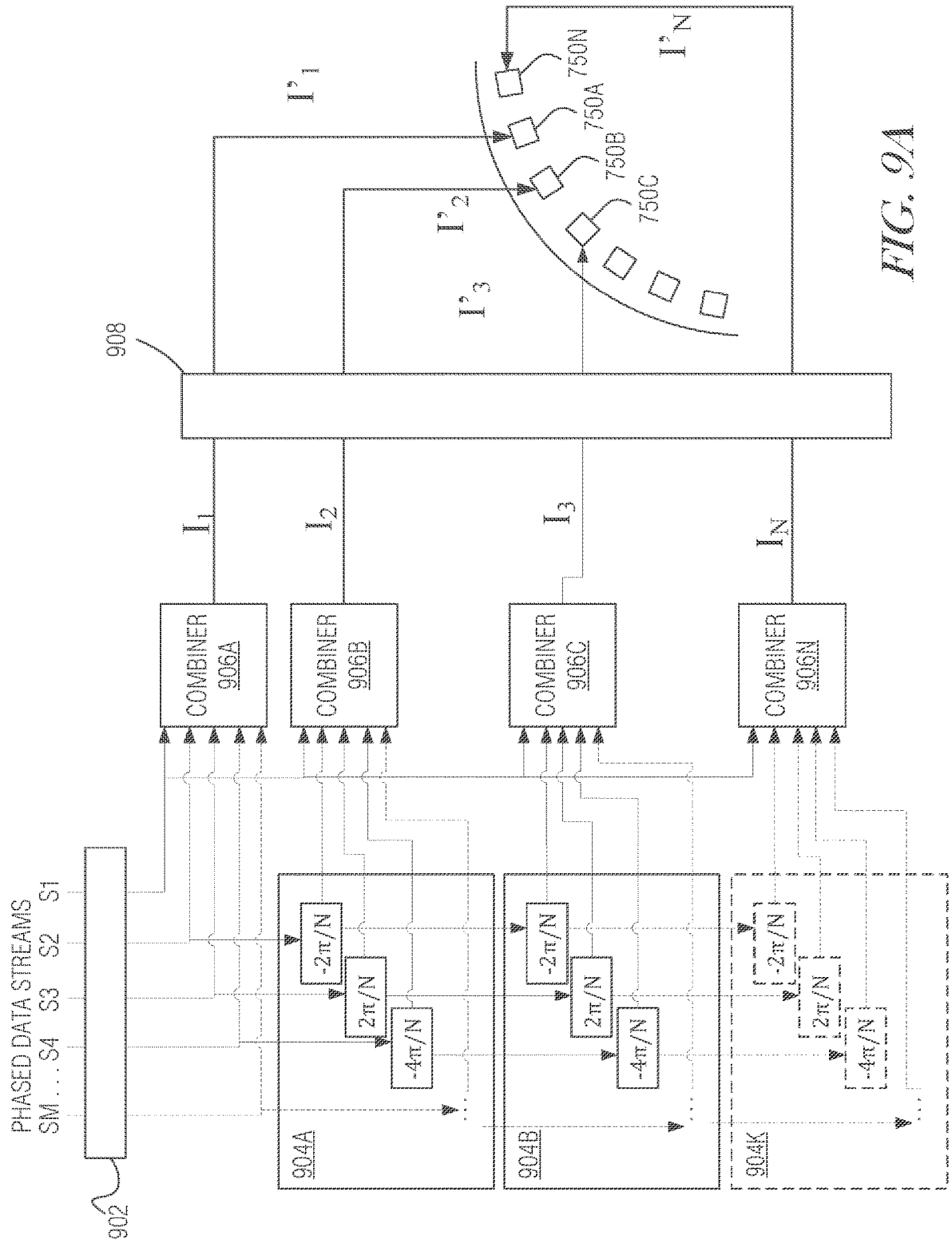
FIG. 9A is a block diagram illustrating a transmitter system for simultaneously transmitting a set of OAM modes, which may be used as separate channels, according to some aspects.
Figure 9B:
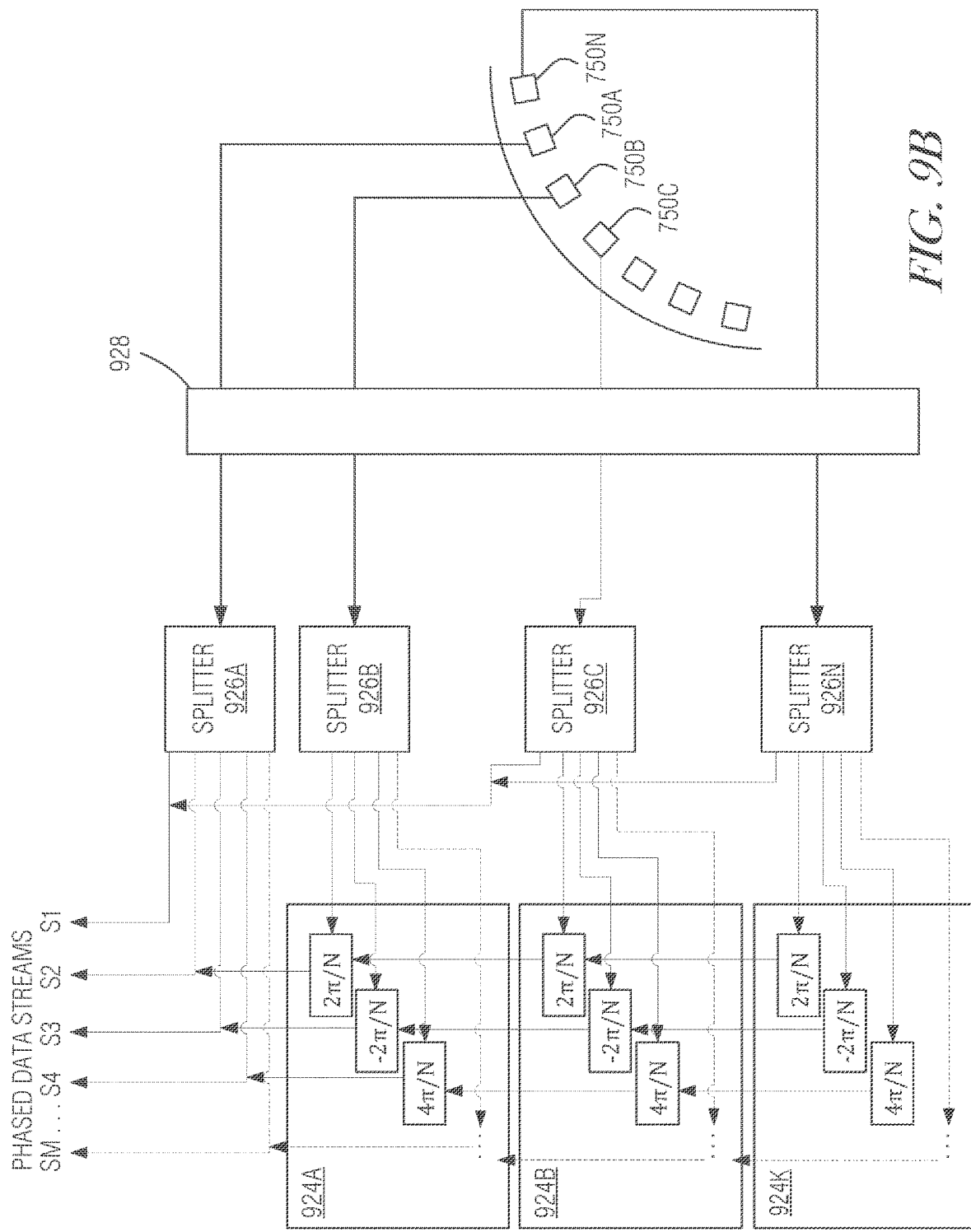
FIG. 9B is a block diagram illustrating a receiver system according to some aspects.

FIG. 9A is a block diagram illustrating a transmitter system for simultaneously transmitting a set of M OAM modes, which may be used as separate channels, using a single N-element antenna array, such as an antenna array of FIGS. 7A-7C, according to some examples. FIG. 9B is a block diagram illustrating a receiver system according to related examples.

In the transmit side depicted in FIG. 9A, each array element 750A, B, C, . . . , N is fed with the aggregate of M phased RF data streams $S_n$. These data streams may be represented by their baseband equivalent representations as $S_n e^{j\Theta_n}$ across M modes. In some examples, the phased data streams $S_n$ have a continuously-varying progressive phase. In other examples, the phase may be varied according to a phase-variation function having a variable phase-variation rate.

In the example depicted, data streams S1, S2, S3, S4, . . . , SM are provided to signal inputs 902. Signal inputs 902 pass the data streams S1, S2, S3, S4, . . . , SM to phase shifter sets 904A, 904B, 904C, . . . , 904K (where K=N−1), which operate to apply phase offsets to the data streams as shown. Each phase shifter set 904 includes phase-offset processors that apply a phase shift of integer multiples of 2π/N radians. Combiners 906A-906N may additively combine their respective input data streams to produce antenna element-specific signals $I_1$-$I_N$.

In the example depicted, data stream S1 bypasses the phase shifter sets 904A, 904B, 904C, . . . , 904N, and is instead passed directly to combiners 906A, 906B, 906C, . . . , 906N. Combiner 906A is passed non-phase-shifted data streams S1-SM, and produces antenna element-specific signal $I_1$. Each successive combiner 906B, 906C, . . . , 906N is passed successively-shifted data streams S2-SM, along with non-shifted data stream S1.

Accordingly, the outputs of phase shifter set 904A are fed to combiner 906B, which produces antenna element-specific signal $I_2$. Phase shifter sets 904B, . . . , 904K are cascaded, such that each successive phase shifter set further shifts the respective phase-shifted data stream as shown. The outputs of phase shifter set 904B are fed to combiner 906C, which produces antenna element-specific signal 13. Each successive phase shifter set 904C-904K follows this pattern and provides phase-shifted outputs to its corresponding combiner 906C-906N to produce antenna element-specific signals $I_3$-$I_N$, respectively.

Each antenna element-specific signal I may be further processed (e.g., filtered or amplified), or switchably coupled, by antenna interface circuitry 908, to its corresponding antenna element 750A, 750B, 750C, . . . , 750N. The output of antenna interface circuitry includes antenna element-excitation signals $I'_1$, $I'_2$, $I'_3$, . . . , $I'_N$. Antenna element-excitation signals $I'_1$-$I'_N$, are fed to respective antenna elements 750A-750N.

Each channel is a single OAM mode (mode m∈ {0, ±1, . . . }) produced by N phased components to/from N array elements with relative phase angles:

$$\phi_n[i] = 2\pi\left(\frac{m_n(i-1)}{N}\right),$$

where i=1, . . . , N; n=1, . . . , M; and $m_n \in \{0, \pm 1, \pm 2, \ldots\}$.

M simultaneous orthogonal channels are produced by M distinct and consecutive choices of integer $m_n \in \{0, \pm 1 \ldots\}$. For instance, $$\left\{\ldots -3, -2, \overline{-1, 0, +1, +2,}^{\{m_n\}_{1 \times M}} + 3 \ldots\right\}.$$

Therefore, on the transmit side, equivalent baseband representation of the aggregate antenna element-specific signal to the ith element is given by:

$$I_i = \sum_{m \in \{0, \pm 1, \ldots\}} S_n e^{j2\pi\left(\frac{m_n(i-1)}{N}\right)}, \quad i = 1, 2, \ldots, N.$$

Where the symbol $\Sigma$ represents a combiner circuit such as combiner 906N.

Note that for consecutive $m_n$, the expression for $I_i$ is identical to a discrete Fourier Transform. Analogous to the time/frequency analysis, the number of possible orthogonal channels may not exceed the number of array elements. Therefore, the expression M≤N holds true according to some examples.

The receive side, depicted in FIG. 9B, is essentially an inverse operation, with the antenna elements 750A-750N feeding into splitters 926A, 926B, 926C, ..., 926N, and then the separated signals from splitters 926B-926N are fed to inverse phase shifters 924A, 924B, ..., 924K to reverse the shifting operation performed by the counterpart stage of the transmitter side and restore signals S1, S2, S3, S4, ..., SN. Receiver front-end circuitry 928 may perform signal amplification, filtering, or other processing before the received signals from antenna elements 750A-750N are provided to the splitters 926A-926N.

In a related example, where the number of channels and antennas elements are equal (i.e., M=N) and can be represented as a power of 2, the transmit/receive array input/output may be efficiently produced/detected in the baseband by Fast Fourier Transform operations (IFFT/FFT) followed/preceded by RF up/down conversions. Notably, baseband OAMDM (OAM Division Multiplexing) in this approach is an exact replica of baseband OFDM, except in the former, the data is modulated onto different OAM modes rather than different frequency carriers.

In a related example, beam steering is incorporated with the OAM antenna element-specific signal in order to preserve OAM mode purity (cross-channel orthogonality, hence throughput) for an off-axis receiver/transmitter pair. Generally speaking, the reliability of OAM communication is contingent on the ability of the receiver to "recognize" the exact spatial structure of the OAM beam(s) incident upon its aperture. For example, if OAM mode order m=1 is transmitted to an off-axis receiver (i.e. not directly facing the transmitter), an angular projection of the original OAM beam is "seen" by the receiver. This angular projection results in a physical and mathematical projection of a fraction of the energies in m=1 into nearby OAM modes such as modes m=0 and m=2. This angular projection creates inter-mode interference. Beam steering according to these examples mitigates this problem by enabling the transmitter to orient the OAM beam to be on same axis as the receiver.

According to one type of example, beam steering is achieved through the selection of antenna elements. Referring again to FIG. 7B, selectable sets of antenna element 760, 770 may be separately selected by output circuitry 908, for example, to steer the OAM beams along a different axis. In examples where the antenna elements are situated on a planar (flat) surface, selection of a different set of antenna elements tends to impart translational shifting of the axis of beam propagation. In examples where the antenna elements are on a contoured surface, such as the example depicted in FIG. 7C, selection of a different set of antenna elements tends to impart rotational shifting (i.e., pivoting) of the axis of beam propagation along with some translational shifting due to the positioning of the different sets of antenna elements. In a related type of example, one or more antenna lenses may be utilized to correct for any misalignments between the antenna array of the transmitter and the antenna array of the receiver.

Figure 10:
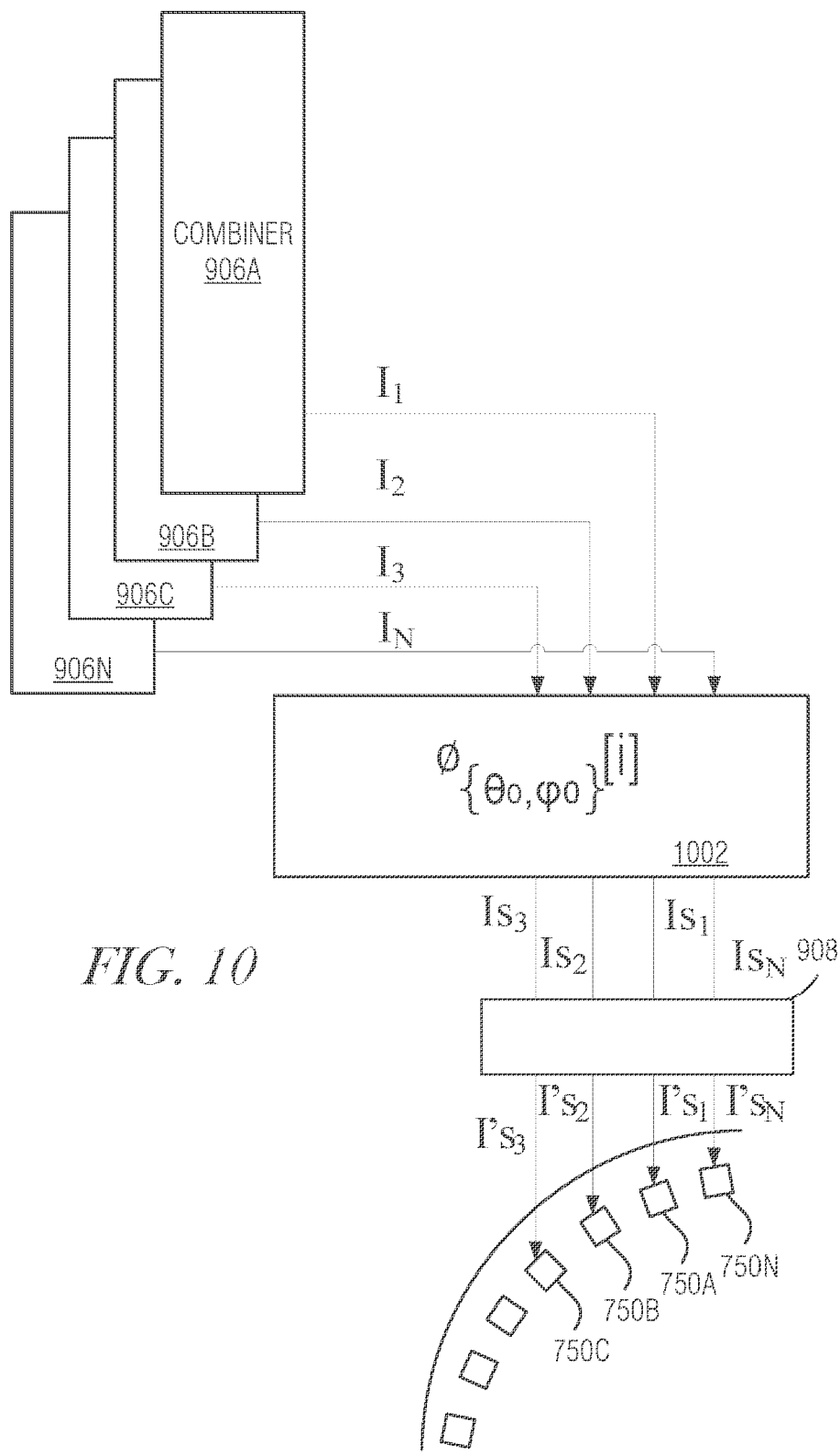
FIG. 10 is a diagram illustrating an addition of a beam-steering engine to the transmitter of the arrangement of FIG. 9A according to some aspects.

FIG. 10 depicts an addition of a beam steering engine 1002 to the transmitter-side OAM arrangement of FIG. 9A according to some examples. Beam steering engine 1002, also labeled $\emptyset_{\{\theta_o, \varphi_o\}}[i]$, as depicted, is situated to operate on element-specific signals $I_1, I_2, I_3, \ldots, I_N$, which it receives as its input. In an example, beam steering engine 1002 applies a beam axis rotation towards $\{\theta_o, \varphi_o\}$ for each antenna element-specific signal I by phasing the array signal according to:

$$\phi_{\{\theta_o, \varphi_o\}}[i] = 2\pi \frac{\rho_a}{\lambda} \sin\theta_o \cos\left(\frac{2\pi(i-1)}{N} - \varphi_o\right),$$

where i=1, 2, ... N, and where, $$\frac{\rho_a}{\lambda}$$

is the array radius normalized to wavelength. As a result, steered antenna element-specific signals $Is_1, Is_2, Is_3, \ldots, Is_N$ are produced, and passed to output circuitry 908, which may further process and amplify the signals to produce steered antenna element excitation signals $I's_1, I's_2, I's_3, \ldots, I's_N$, which in turn are fed to antenna elements 750A, 750B, 750C, ..., 750N.

Figure 11:
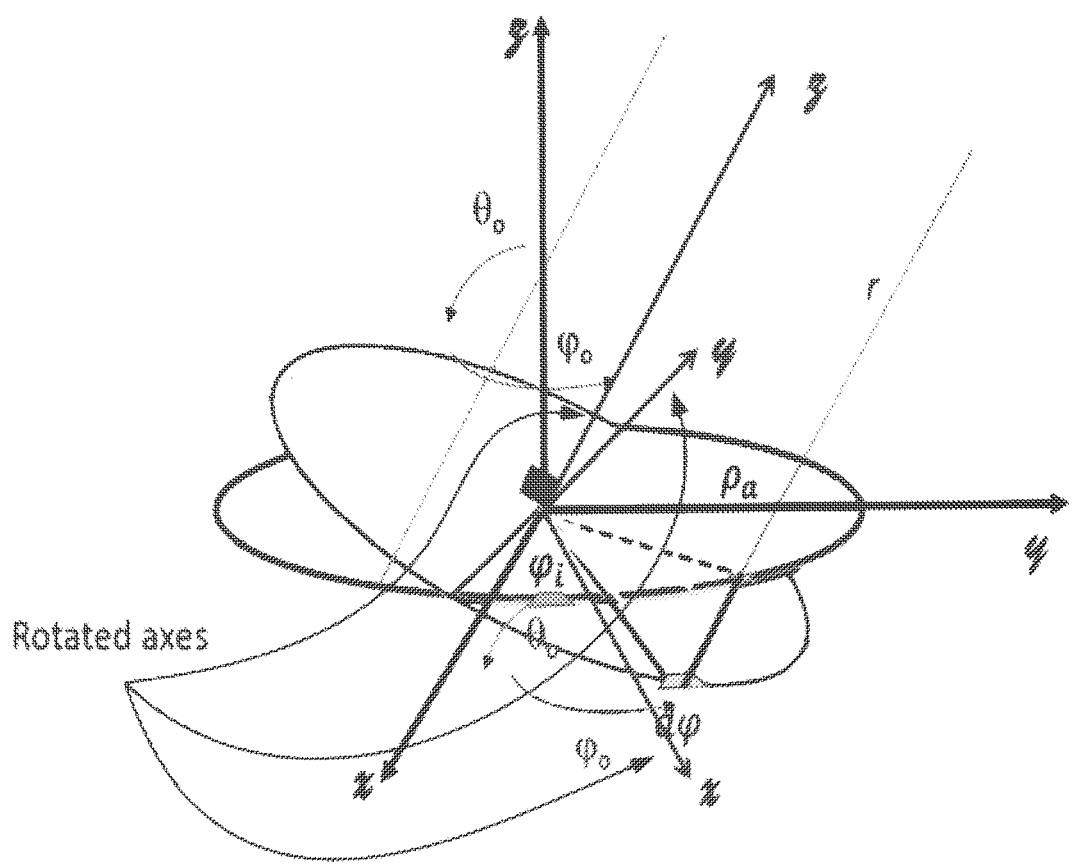
FIG. 11 is a diagram visually depicting steering of the beam radiated by a ring antenna according to an aspect.

FIG. 11 is a diagram visually depicting steering of the beam radiated by a ring antenna of excitation current $I(\varphi)$ according to an example. In order to rotate the beam angle towards the direction $\{\theta_o, \varphi_o\}$, the system adjusts the phase such that its projection onto the plane perpendicular to the desired beam direction approximates $\emptyset_{\{\theta_o, \varphi_o\}}[i]$ given above. As an example, with reference to FIG. 11, consider two infinitely close points at $\varphi_i$ and $\varphi_{i-1}$;

$$d\phi(\varphi_i) = \Delta\phi(\varphi_i) - \Delta\phi(\varphi_{i-1})$$

$$= \frac{2\pi\rho_a}{\lambda}\sin\theta_o(\cos(\varphi_i - \varphi_o) - \cos(\varphi_{i-1} - \varphi_o))$$

$$= -\frac{4\pi\rho_a}{\lambda}\sin\theta_o\sin\left(\frac{\varphi_i - \varphi_{i-1}}{2}\right)\sin\left(\frac{\varphi_i + \varphi_{i-1} - 2\varphi_o}{2}\right)$$

$$\cong -\frac{2\pi\rho_a}{\lambda}(\varphi_i - \varphi_{i-1})\sin\theta_o\sin(\varphi_i - \varphi_o)$$

$$\Rightarrow d\phi = -\frac{2\pi\rho_a}{\lambda}\sin\theta_o\sin(\varphi - \varphi_o)d\varphi$$

Thus, the angle $\emptyset(\varphi)$ in radians, is:

$$\phi(\varphi) = \frac{2\pi\rho_a}{\lambda}\sin\theta_o\cos(\varphi - \varphi_o)$$

Therefore, for beam rotation towards $\{\theta_o, \varphi_o\}$, the following current distribution adjustment is made:

$$I_m^{\{\theta_o,\varphi_o\}}(\varphi) = I_m(\varphi)e^{-j\frac{2\pi\rho_a}{\lambda}\sin\theta_o\cos(\varphi-\varphi_o)}$$

$$I_m^{\{\theta_o,\varphi_o\}}(\varphi) = Ae^{-j\left[m\varphi+\frac{2\pi\rho_a}{\lambda}\sin\theta_o\cos(\varphi-\varphi_o)\right]}$$

In some examples having a uniform N-element circular array with elements at angles $$\varphi_i = \frac{2\pi(i-1)}{N}$$

around a circle of radius $\rho_a$, the ith element is excited as below to approximate a mode m OAM in the $\{\theta_o, \varphi_o\}$ direction:

$$I_m^{\{\theta_o,\varphi_o\}}[i] = Ae^{-j2\pi\left[\frac{m(i-1)}{N}+\frac{\rho_a}{\lambda}\sin\theta_o\cos\left(\frac{2\pi(i-1)}{N}-\varphi_o\right)\right]}$$

where i=1, 2, ..., N.

In some examples, the approximation holds for steering up to elevation angles of about 20°. For steering to larger angles, steering angle dependent pre-distortion may be applied to the input signals to pre-compensate for the distortion and minimize cross-talk. In an example operation, the transmitting device varies the beam-steering direction until an effective communication with the receiver is reported. For instance, a signal-to-noise ratio (SNR, SINR), bit-error rate, or other communication performance measure, may be reported back to the transmitting device. In response, the transmitting device may vary the beam-steering direction for the antenna element-specific signals I until a maximum or sufficiently high performance measure (e.g., meeting predefined criteria) is attained by the OAM-multiplexed channels.

In a related example, which may be used in conjunction with the beam-steering approach discussed above with reference to FIGS. 10-11, or independently of the above-described beam-steering approach, a multi-set antenna arrangement with selectable sets of antenna elements, such as the examples described above with reference to FIGS. 7B-7C, may be used to steer the OAM beams. The selectable-antenna-set beam steering may be used to adjust for off-center alignments between the transmitter and receiver antennas, for example. In a combined example that uses electronic beam steering together with selectable-antenna-set beam steering, the antenna set-based beam steering may be used as a coarse beam-steering adjustment, while the electronic beam steering may be used as a finer adjustment.

Figure 12:
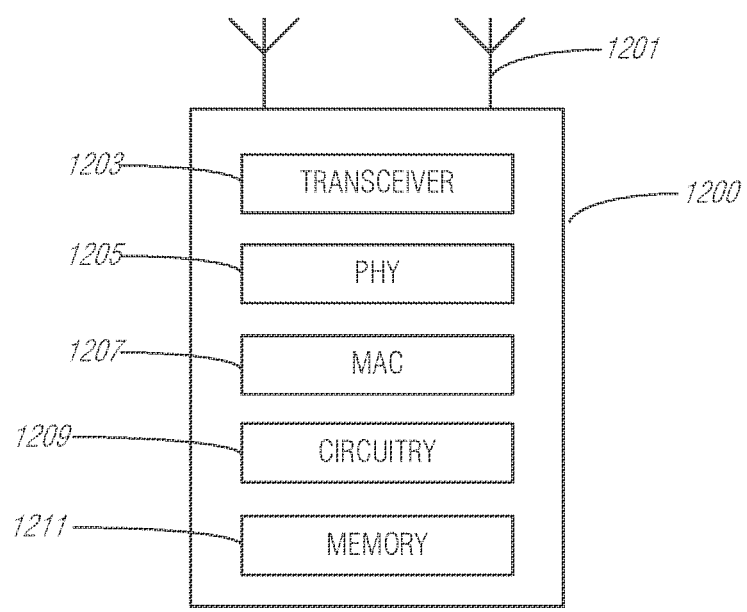
FIG. 12 illustrates a high-efficiency wireless (HEW) device in accordance with some aspects.

FIG. 12 illustrates a HEW device 1200 in accordance with some examples. HEW device 1200 may be an HEW compliant device that may be arranged to communicate with one or more other HEW devices, such as HEW STAs 104 (FIG. 1) or controlling station 102 (FIG. 1) as well as communicate with legacy devices 106 (FIG. 1). HEW STAs 104 and legacy devices 106 may also be referred to as HEW devices and legacy STAs, respectively. HEW device 1200 may be suitable for operating as controlling station 102 (FIG. 1) or a HEW STA 104 (FIG. 1). In accordance with examples, HEW device 1200 may include, among other things, a transmit/receive element 1201 (for example an antenna), a transceiver 1203, physical (PHY) circuitry 1205, and media access control (MAC) circuitry 1207. PHY circuitry 1205 and MAC circuitry 1207 may be HEW compliant layers and may also be compliant with one or more legacy IEEE 802.13 standards. MAC circuitry 1207 may be arranged to configure packets such as a physical layer convergence procedure (PLCP) protocol data unit (PPDUs) and arranged to transmit and receive PPDUs, among other things. HEW device 1200 may also include circuitry 1209 and circuitry 1209 configured to perform the various operations described herein. The circuitry 1209 may be coupled to the transceiver 1203, which may be coupled to the transmit/receive element 1201.

In some examples, the MAC circuitry 1207 may be arranged to contend for a wireless medium during a contention period to receive control of the medium for the HEW control period and configure an HEW PPDU. In some examples, the MAC circuitry 1207 may be arranged to contend for the wireless medium based on channel contention settings, a transmitting power level, and a CCA level.

The PHY circuitry 1205 may be arranged to transmit the HEW PPDU. The PHY circuitry 1205 may include circuitry for modulation/demodulation, upconversion/downconversion, filtering, amplification, etc. In some examples, the circuitry 1209 may include one or more processors. The circuitry 1209 may be configured to perform functions based on instructions being stored in a RAM or ROM, or based on special purpose circuitry. The circuitry 1209 may include processing circuitry and/or transceiver circuitry in accordance with some examples. The circuitry 1209 may include a processor such as a general purpose processor or special purpose processor. The circuitry 1209 may implement one or more functions associated with transmit/receive elements 1201, the transceiver 1203, the PHY circuitry 1205, the MAC circuitry 1207, and/or the memory 1211.

In some examples, the circuitry 1209 may be configured to perform one or more of the functions and/or methods described herein and/or in conjunction with FIGS. 1-11.

In some examples, the transmit/receive elements 1201 may be two or more antennas that may be coupled to the PHY circuitry 1205 and arranged for sending and receiving signals including transmission of the HEW packets. The transceiver 1203 may transmit and receive data such as HEW PPDU and packets that include an indication that the HEW device 1200 should adapt the channel contention settings according to settings included in the packet. The memory 1211 may store information for configuring the other circuitry to perform operations for configuring and transmitting HEW packets and performing the various operations to perform one or more of the functions and/or methods described herein and/or in conjunction with FIGS. 1-11.

In some examples, the HEW device 1200 may be configured to communicate using OFDM communication signals over a multicarrier communication channel. In some examples, HEW device 1200 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the embodiments is not limited in this respect as they may also be suitable to transmit and/or receive communications in accordance with other techniques and standards. In some examples, the HEW device 1200 may use 4× symbol duration of 802.11n or 802.11ac.

In some examples, an HEW device 1200 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some examples, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 1201 may comprise one or more directional or omnidirectional antennas, including, for example, dipole antennas, monopole antennas, patch antennas, loop antennas, microstrip antennas or other types of antennas suitable for transmission of RF signals. In some MIMO examples, the antennas may be effectively separated to take advantage of spatial diversity and the different channel characteristics that may result.

HEW device 1200 may alternately be called User Equipment (UE), which may be configured to operate as a HEW device or other wireless device. In some examples, the UE may be configured to operate at millimeter wave frequencies. In some examples the UE may be configured to operate in accordance with 5G. In some 5G examples, a UE may communicate data (e.g., using a PDSCH and/or a PUSCH) with a small cell or secondary cell while configured by a larger serving cell or primary cell and receiving control signals from the primary cell (with a PDCCH). In these examples, communications with the smaller cell may take place using mmWave frequencies while communications with the larger cell may take place using microwave frequencies.

Although the HEW device 1200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some examples, the functional elements may refer to one or more processes operating on one or more processing elements.

Some examples may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the device 1200 to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media, a flash memory, etc.

Figure 13:
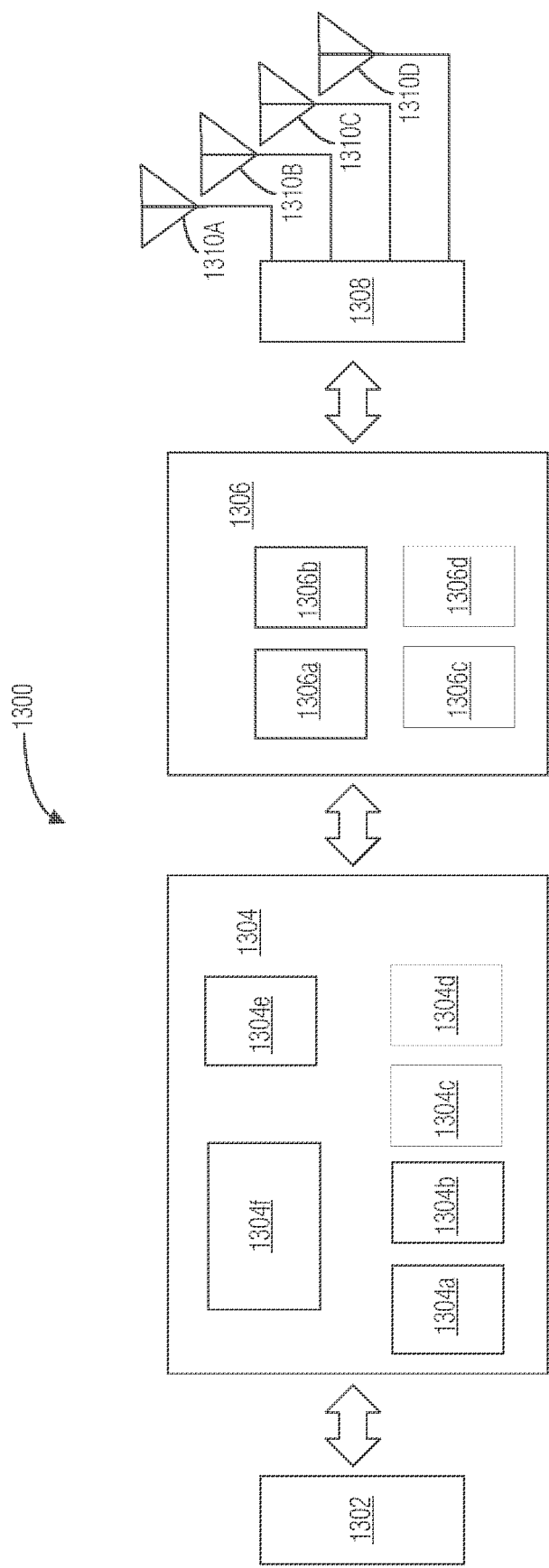
FIG. 13 is a functional diagram of a User Equipment (UE) in accordance with some aspects.

FIG. 13 is a functional diagram of a User Equipment (UE) in accordance with some examples. The UE 1300 may be suitable for use as a UE 302 as depicted in FIG. 3. In some examples, the UE 1300 may include application circuitry 1302, baseband circuitry 1304, Radio Frequency (RF) circuitry 1306, front-end module (FEM) circuitry 1308 and multiple antennas 1310A-1310D, coupled together at least as shown. In some examples, other circuitry or arrangements may include one or more elements or components of the application circuitry 1302, the baseband circuitry 1304, the RF circuitry 1306 or the FEM circuitry 1308, and may also include other elements or components in some cases. As an example, "processing circuitry" may include one or more elements or components, some or all of which may be included in the application circuitry 1302 or the baseband circuitry 1304. As another example, "transceiver circuitry" may include one or more elements or components, some or all of which may be included in the RF circuitry 1306 or the FEM circuitry 1308. These examples are not limiting, however, as the processing circuitry or the transceiver circuitry may also include other elements or components in some cases.

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the system.

The baseband circuitry 1304 may include circuitry such as, but not limited to, one or more single-core or multi-core processors. The baseband circuitry 1304 may include one or more baseband processors or control logic to process baseband signals received from a receive signal path of the RF circuitry 1306 and to generate baseband signals for a transmit signal path of the RF circuitry 1306. Baseband processing circuitry 1304 may interface with the application circuitry 1302 for generation and processing of the baseband signals and for controlling operations of the RF circuitry 1306. For example, in some examples, the baseband circuitry 1304 may include a second generation (2G) baseband processor 1304a, third generation (3G) baseband processor 1304b, fourth generation (4G) baseband processor 1304c, or other baseband processor(s) 1304d for other existing generations, generations in development or to be developed in the future (e.g., fifth generation (5G), 6G, etc.). The baseband circuitry 1304 (e.g., one or more of baseband processors 1304a-d) may handle various radio control functions that enable communication with one or more radio networks via the RF circuitry 1306. The radio control functions may include, but are not limited to, signal modulation/demodulation, encoding/decoding, radio frequency shifting, etc. In some examples, modulation/demodulation circuitry of the baseband circuitry 1304 may include Fast-Fourier Transform (FFT), precoding, or constellation mapping/demapping functionality. In some examples, encoding/decoding circuitry of the baseband circuitry 1304 may include Low Density Parity Check (LDPC) encoder/decoder functionality, optionally along-side other techniques such as, for example, block codes, convolutional codes, turbo codes, or the like, which may be used to support legacy protocols. Examples of modulation/demodulation and encoder/decoder functionality are not limited to these examples and may include other suitable functionality in other examples.

In some examples, the baseband circuitry 1304 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), or radio resource control (RRC) elements. A central processing unit (CPU) 1304e of the baseband circuitry 1304 may be configured to run elements of the protocol stack for signaling of the PHY, MAC, RLC, PDCP or RRC layers. In some examples, the baseband circuitry may include one or more audio digital signal processor(s)(DSP) 1304f. The audio DSP(s) 1304f may be include elements for compression/decompression and echo cancellation and may include other suitable processing elements in other examples. Components of the baseband circuitry may be suitably combined in a single chip, a single chipset, or disposed on a same circuit board in some examples. In some examples, some or all of the constituent components of the baseband circuitry 1304 and the application circuitry 1302 may be implemented together such as, for example, on a system on chip (SOC).

In some examples, the baseband circuitry 1304 may provide for communication compatible with one or more radio technologies. For example, in some examples, the baseband circuitry 1304 may support communication with an evolved universal terrestrial radio access network (EUTRAN) or other wireless metropolitan area networks (WMAN), a wireless local area network (WLAN), a wireless personal area network (WPAN). Examples in which the baseband circuitry 1304 is configured to support radio communications of more than one wireless protocol may be referred to as multi-mode baseband circuitry.

RF circuitry 1306 may enable communication with wireless networks using modulated electromagnetic radiation through a non-solid medium. In various examples, the RF circuitry 1306 may include switches, filters, amplifiers, etc. to facilitate the communication with the wireless network. RF circuitry 1306 may include a receive signal path which may include circuitry to down-convert RF signals received from the FEM circuitry 1308 and provide baseband signals to the baseband circuitry 1304. RF circuitry 1306 may also include a transmit signal path which may include circuitry to up-convert baseband signals provided by the baseband circuitry 1304 and provide RF output signals to the FEM circuitry 1308 for transmission.

In some examples, the RF circuitry 1306 may include a receive signal path and a transmit signal path. The receive signal path of the RF circuitry 1306 may include mixer circuitry 1306a, amplifier circuitry 1306b and filter circuitry 1306c. The transmit signal path of the RF circuitry 1306 may include filter circuitry 1306c and mixer circuitry 1306a. RF circuitry 1306 may also include synthesizer circuitry 1306d for synthesizing a frequency for use by the mixer circuitry 1306a of the receive signal path and the transmit signal path. In some examples, the mixer circuitry 1306a of the receive signal path may be configured to down-convert RF signals received from the FEM circuitry 1308 based on the synthesized frequency provided by synthesizer circuitry 1306d. The amplifier circuitry 1306b may be configured to amplify the down-converted signals and the filter circuitry 1306c may be a low-pass filter (LPF) or band-pass filter (BPF) configured to remove unwanted signals from the down-converted signals to generate output baseband signals. Output baseband signals may be provided to the baseband circuitry 1304 for further processing. In some examples, the output baseband signals may be zero-frequency baseband signals, although this is not a requirement. In some examples, mixer circuitry 1306a of the receive signal path may comprise passive mixers, although the scope of the examples is not limited in this respect. In some examples, the mixer circuitry 1306a of the transmit signal path may be configured to up-convert input baseband signals based on the synthesized frequency provided by the synthesizer circuitry 1306d to generate RF output signals for the FEM circuitry 1308. The baseband signals may be provided by the baseband circuitry 1304 and may be filtered by filter circuitry 1306c. The filter circuitry 1306c may include a low-pass filter (LPF), although the scope of the examples is not limited in this respect.

In some examples, the mixer circuitry 1306a of the receive signal path and the mixer circuitry 1306a of the transmit signal path may include two or more mixers and may be arranged for quadrature downconversion or upconversion respectively. In some examples, the mixer circuitry 1306a of the receive signal path and the mixer circuitry 1306a of the transmit signal path may include two or more mixers and may be arranged for image rejection (e.g., Hartley image rejection). In some examples, the mixer circuitry 1306a of the receive signal path and the mixer circuitry 1306a may be arranged for direct downconversion or direct upconversion, respectively. In some examples, the mixer circuitry 1306a of the receive signal path and the mixer circuitry 1306a of the transmit signal path may be configured for super-heterodyne operation.

In some examples, the output baseband signals and the input baseband signals may be analog baseband signals, although the scope of the examples is not limited in this respect. In some alternate examples, the output baseband signals and the input baseband signals may be digital baseband signals. In these alternate examples, the RF circuitry 1306 may include analog-to-digital converter (ADC) and digital-to-analog converter (DAC) circuitry and the baseband circuitry 1304 may include a digital baseband interface to communicate with the RF circuitry 1306. In some dual-mode examples, a separate radio IC circuitry may be provided for processing signals for each spectrum, although the scope of the examples is not limited in this respect.

In some examples, the synthesizer circuitry 1306d may be a fractional-N synthesizer or a fractional N/N+1 synthesizer, although the scope of the examples is not limited in this respect as other types of frequency synthesizers may be suitable. For example, synthesizer circuitry 1306d may be a delta-sigma synthesizer, a frequency multiplier, or a synthesizer comprising a phase-locked loop with a frequency divider. The synthesizer circuitry 1306d may be configured to synthesize an output frequency for use by the mixer circuitry 1306a of the RF circuitry 1306 based on a frequency input and a divider control input. In some examples, the synthesizer circuitry 1306d may be a fractional N/N+1 synthesizer. In some examples, frequency input may be provided by a voltage controlled oscillator (VCO), although that is not a requirement. Divider control input may be provided by either the baseband circuitry 1304 or the applications processor 1302 depending on the desired output frequency. In some examples, a divider control input (e.g., N) may be determined from a look-up table based on a channel indicated by the applications processor 1302.

Synthesizer circuitry 1306d of the RF circuitry 1306 may include a divider, a delay-locked loop (DLL), a multiplexer and a phase accumulator. In some examples, the divider may be a dual modulus divider (DMD) and the phase accumulator may be a digital phase accumulator (DPA). In some examples, the DMD may be configured to divide the input signal by either N or N+1 (e.g., based on a carry out) to provide a fractional division ratio. In some examples, the DLL may include a set of cascaded, tunable, delay elements, a phase detector, a charge pump and a D-type flip-flop. In these examples, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some examples, synthesizer circuitry 1306d may be configured to generate a carrier frequency as the output frequency, while in other examples, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some examples, the output frequency may be a LO frequency (fLO). In some examples, the RF circuitry 1306 may include an IQ/polar converter.

FEM circuitry 1308 may include a receive signal path which may include circuitry configured to operate on RF signals received from one or more of the antennas 1310A-D, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1310A-D.

In some examples, the FEM circuitry 1308 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310. In some examples, the UE 1300 may include additional elements such as, for example, memory/storage, display, camera, sensor, or input/output (I/O) interface.

Figure 14:
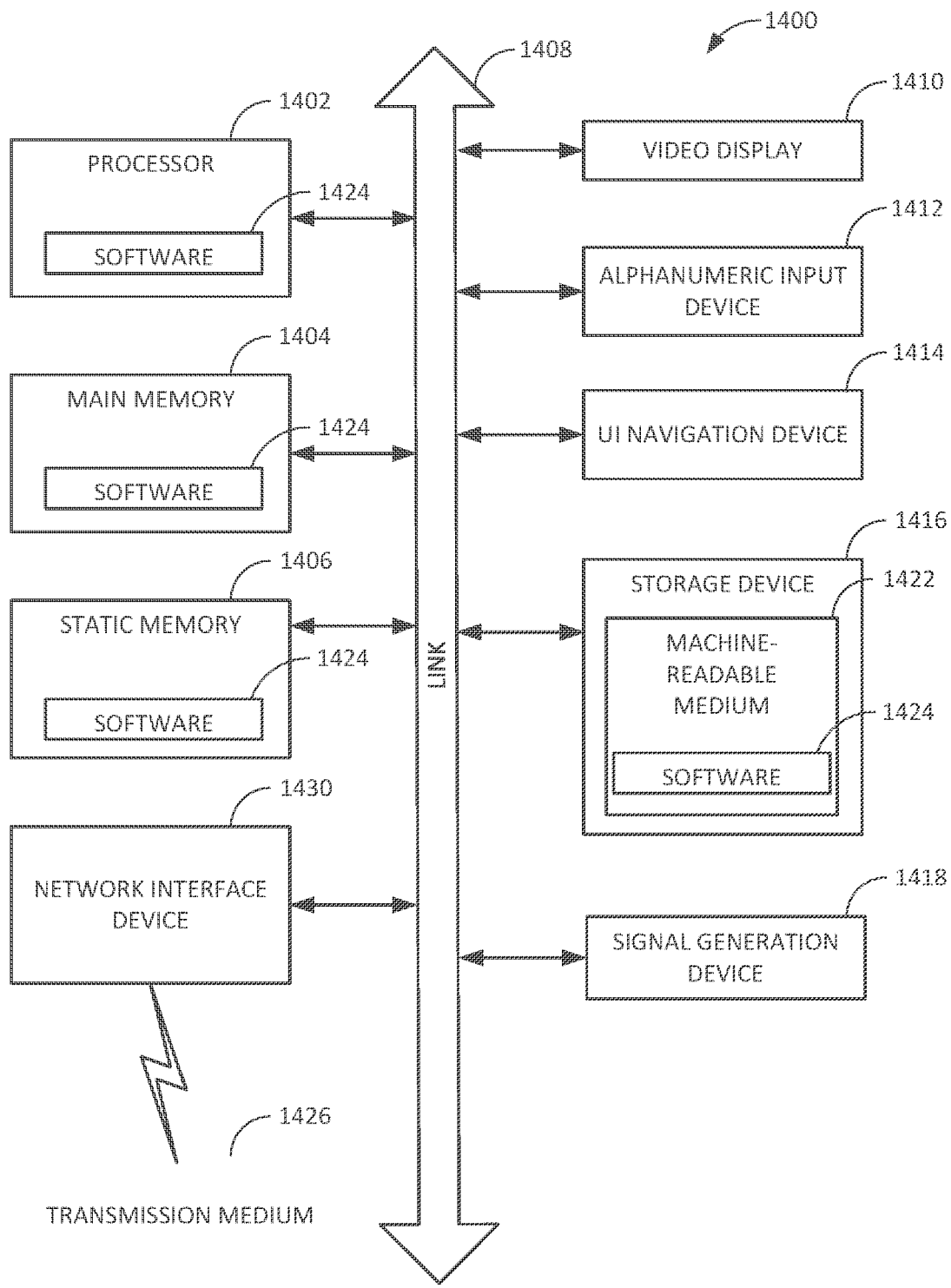
FIG. 14 is a block diagram illustrating an example machine in accordance with some aspects, upon which any one or more of the techniques (e.g., methodologies) discussed herein may be performed.

FIG. 14 is a block diagram illustrating an example machine 1400 in accordance with some examples, upon which any one or more of the techniques (e.g., methodologies) discussed herein may be performed. In alternative examples, the machine 1400 may operate as a standalone device or may be connected (e.g., networked) to other machines. In a networked deployment, the machine 1350 may operate in the capacity of a server machine, a client machine, or both in server-client network environments. In an example, the machine 1400 may act as a peer machine in peer-to-peer (P2P) (or other distributed) network environment. The machine 1400 may be a UE, eNB, AP, STA, etc., personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, circuits, modules, or engines, which for the sake of brevity may be collectively referred to as engines. Engines are tangible entities (e.g., hardware) capable of performing specified operations and may be configured or arranged in a certain manner. In an example, circuits may be arranged (e.g., internally or with respect to external entities such as other circuits) in a specified manner as an engine. In an example, the whole or part of one or more computer systems (e.g., a standalone, client or server computer system) or one or more hardware processors may be configured by firmware or software (e.g., instructions, an application portion, or an application) as an engine that operates to perform specified operations. In an example, the software may reside on a machine readable medium. In an example, the software, when executed by the underlying hardware of the engine, causes the hardware to perform the specified operations.

Accordingly, the term "engine" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which engines are temporarily configured, each of the engines need not be instantiated at any one moment in time. For example, where the engines comprise a general-purpose hardware processor configured using software, the general-purpose hardware processor may be configured as respective different engines at different times. Software may accordingly configure a hardware processor, for example, to constitute a particular engine at one instance of time and to constitute a different engine at a different instance of time.

In certain examples, programming of the machine 1400 according to one or more particular algorithms produces a special-purpose machine upon execution of that programming.

Example machine 1400 includes at least one processor 1402 (e.g., a central processing unit (CPU), a graphics processing unit (GPU) or both, processor cores, compute nodes, etc.), a main memory 1404 and a static memory 1406, which communicate with each other via a link 1408 (e.g., bus). The machine 1400 may further include a video display unit 1410, an alphanumeric input device 1412 (e.g., a keyboard), and a user interface (UI) navigation device 1414 (e.g., a mouse). In one example, the video display unit 1410, input device 1412 and UI navigation device 1414 are incorporated into a touch screen display. The machine 1400 may additionally include a storage device 1416 (e.g., a drive unit), a signal generation device 1418 (e.g., a speaker), a network interface device (NID) 1420, and one or more sensors (not shown), such as a global positioning system (GPS) sensor, compass, accelerometer, or other sensor.

The storage device 1416 includes a machine-readable medium 1422 on which is stored one or more sets of data structures and instructions 1424 (e.g., software) embodying or utilized by any one or more of the methodologies or functions described herein. The instructions 1424 may also reside, completely or at least partially, within the main memory 1404, static memory 1406, and/or within the processor 1402 during execution thereof by the machine 1400, with the main memory 1404, static memory 1406, and the processor 1402 also constituting machine-readable media.

While the machine-readable medium 1422 is illustrated in an example to be a single medium, the term "machine-readable medium" may include a single medium or multiple media (e.g., a centralized or distributed database, and/or associated caches and servers) that store the one or more instructions 1424. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

NID 1430 according to various examples may take any suitable form factor. In one such example, NID 1420 is in the form of a network interface card (NIC) that interfaces with processor 1402 via link 1408. In one example, link 1408 includes a PCI Express (PCIe) bus, including a slot into which the NIC form-factor may removably engage. In another example, NID 1420 is a network interface circuit laid out on a motherboard together with local link circuitry, processor interface circuitry, other input/output circuitry, memory circuitry, storage device and peripheral controller circuitry, and the like. In another example, NID 1420 is a peripheral that interfaces with link 1408 via a peripheral input/output port such as a universal serial bus (USB) port. NID 1420 transmits and receives data over transmission medium 1426, which may be wireless (e.g., radio frequency). The instructions 1424 may further be transmitted or received over a transmission medium 1426 via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1420 may include one or more antennas to connect to the transmission medium 1426. In an example, the network interface device 1420 may include antennas to wirelessly communicate using at least one of single-input multiple-output (SIMO), multiple-input multiple-output (MIMO), or multiple-input single-output (MISO) techniques. In some examples, the network interface device 1420 may wirelessly communicate using Multiple User MIMO techniques. The term "transmission medium" shall be taken to include any intangible medium that is capable of storing, encoding or carrying instructions for execution by the machine, and includes digital or analog communications signals or other intangible medium to facilitate communication of such software.

EXAMPLES

Example 1 is a radio-communications apparatus configured for orbital angular momentum (OAM)-based multiplexing, the apparatus comprising: a plurality of signal inputs to receive a plurality of distinct data streams to be multiplexed and transmitted according to a corresponding plurality of OAM modes; and multiplexing circuitry to generate a set of antenna element-specific signals corresponding to respective antenna elements of an antenna array, wherein each antenna element-specific signal is based on corresponding distinct data streams.

In Example 2, the subject matter of Example 1 optionally includes wherein the plurality of OAM modes represent multiple spatial modes of radio wave propagation based on phase-angle offsetting of the distinct data streams.

In Example 3, the subject matter of any one or more of Examples 1-2 optionally include wherein the distinct data streams are in an offset-phase relationship with one another.

In Example 4, the subject matter of any one or more of Examples 1-3 optionally include wherein each antenna element-specific signal represents a signal component of each one of the plurality of OAM modes.

In Example 5, the subject matter of any one or more of Examples 1-4 optionally include output circuitry communicatively coupling the multiplexing circuitry and the antenna elements of the antenna array, to transfer antenna element excitation signaling to the antenna elements, wherein the antenna element excitation signaling is based on the antenna element-specific signals.

In Example 6, the subject matter of Example 5 optionally includes wherein the antenna elements of the antenna array are arranged in a single elliptical ring pattern.

In Example 7, the subject matter of any one or more of Examples 5-6 optionally include wherein the antenna elements of the antenna array are arranged in a first selectable elliptical ring pattern and a second selectable elliptical ring pattern, wherein the output circuitry is to select between the first and the second selectable elliptical ring patterns.

In Example 8, the subject matter of any one or more of Examples 1-7 optionally include wherein the multiplexing circuitry comprises: a plurality of groups of phase shifters, each group of phase shifters configured to generate an offset-phase relationship between the plurality of distinct data streams, and wherein each group of phase shifters is associated with one of the antenna elements.

In Example 9, the subject matter of Example 8 optionally includes wherein the multiplexing circuitry includes: a set of combiners, each combiner associated with a corresponding one of the groups of phase shifters, wherein the set of combiners is to aggregate outputs of the phase shifters corresponding to the antenna elements.

In Example 10, the subject matter of Example 9 optionally includes wherein the multiplexing circuitry comprises N−1 groups of phase shifters and N combiners.

In Example 11, the subject matter of Example 10 optionally includes wherein each phase shifter of each group of phase shifters creates a phase offset that is an integer multiple of $2\pi/N$ radians.

In Example 12, the subject matter of any one or more of Examples 10-11 optionally include wherein the signal inputs are to accept M distinct data streams, and wherein the multiplexing circuitry is to generate M OAM modes, each OAM mode corresponding to one of the M distinct data streams, and wherein N is equal to or greater than M.

In Example 13, the subject matter of any one or more of Examples 1-12 optionally include wherein each of the distinct data streams includes a signal having a varying progressive phase.

In Example 14, the subject matter of Example 13 optionally includes wherein the varying progressive phase is a continuously-varying progressive phase.

In Example 15, the subject matter of any one or more of Examples 13-14 optionally include wherein each of the distinct data streams is a radio-frequency signal having a common carrier frequency.

In Example 16, the subject matter of any one or more of Examples 1-15 optionally include wherein the multiplexing circuitry is part of a baseband processor circuit.

In Example 17, the subject matter of any one or more of Examples 1-16 optionally include wherein the multiplexing circuitry is part of a set of radio-frequency (RF) chain circuitry.

In Example 18, the subject matter of any one or more of Examples 1-17 optionally include wherein the multiplexing circuitry performs fast Fourier transform (FFT) and RF conversion operations to generate the antenna element-specific signals.

In Example 19, the subject matter of any one or more of Examples 1-18 optionally include a beam steering engine to apply a beam-steering component to each one of the antenna element-specific signals, the beam-steering component including phase offsetting for angular offsetting of a propagation direction of a radiated wave resulting from transmission of the antenna element-specific signals.

In Example 20, the subject matter of Example 19 optionally includes wherein the beam-steering component applies a beam axis rotation operation defined by $$2\pi \frac{\rho_a}{\lambda} \sin\theta_o \cos\left(\frac{2\pi(i-1)}{N} - \varphi_o\right),$$

wherein i=1, 2, ..., N, wherein N is the quantity of antenna elements, and wherein $$\frac{\rho_a}{\lambda}$$

represents the array radius normalized to wavelength, wherein $\theta_0$ represents angular offset of a first axis, and wherein $\varphi_0$ represents an angular offset of a second axis.

Example 21 is a radio-communications apparatus configured for reception of orbital angular momentum (OAM)-based multiplexed signaling, the apparatus comprising: receive signal inputs to accept an aggregated signal comprising a plurality of OAM modes, wherein the aggregated signal includes a set of antenna element-specific signals, corresponding to respective individual antenna elements of an antenna array, and each individual antenna element-specific signal includes a signal component of each one of the OAM modes; and demultiplexing circuitry to extract the distinct data streams from the aggregated signaling, wherein the demultiplexing circuitry includes: a set of splitters, wherein each splitter is individually associated with one of the antenna element-specific signals, and each splitter is configured to split apart portions of each of the OAM modes from a corresponding individual antenna element-specific signal; and a plurality of groups of phase shifters, each group of phase shifters associated with one of set of the splitters, and configured to produce a set of data stream-specific phase shifts corresponding to each of the portions of the OAM modes from the associated individual splitter.

In Example 22, the subject matter of Example 21 optionally includes wherein the plurality of OAM modes represent multiple spatial modes of radio wave propagation based on phase-angle offsetting of distinct data streams.

In Example 23, the subject matter of any one or more of Examples 21-22 optionally include wherein the antenna elements of the antenna array are arranged in a single elliptical ring pattern.

In Example 24, the subject matter of any one or more of Examples 21-23 optionally include wherein the antenna elements of the antenna array are arranged in a first selectable elliptical ring pattern and a second selectable elliptical ring pattern, wherein the output circuitry is to select between the first and the second selectable elliptical ring patterns.

In Example 25, the subject matter of any one or more of Examples 21-24 optionally include wherein the OAM demultiplexing circuitry comprises N−1 groups of phase shifters and N splitters.

In Example 26, the subject matter of Example 25 optionally includes wherein each phase shifter of each group of phase shifters creates a phase offset that is an integer multiple of $2\pi/N$ radians.

In Example 27, the subject matter of any one or more of Examples 25-26 optionally include wherein the OAM demultiplexing circuitry is to recover M distinct data streams, and wherein the OAM demultiplexing circuitry is to decode M OAM modes, each OAM mode corresponding to one of the M distinct data streams, and wherein N is equal to or greater than M.

In Example 28, the subject matter of any one or more of Examples 21-27 optionally include wherein each of the distinct data streams includes a signal having a varying progressive phase.

In Example 29, the subject matter of any one or more of Examples 21-28 optionally include wherein the OAM demultiplexing circuitry is part of a baseband processor circuit.

In Example 30, the subject matter of any one or more of Examples 21-29 optionally include wherein the OAM demultiplexing circuitry is part of a set of radio-frequency (RF) chain circuitry.

In Example 31, the subject matter of any one or more of Examples 21-30 optionally include wherein the OAM demultiplexing circuitry performs fast Fourier transform (FFT) and RF conversion operations to generate the antenna element-specific signals.

Example 32 is at least one machine-readable medium containing instructions that, when executed on communications hardware, cause the communications hardware to perform orbital angular momentum (OAM)-based multiplexing, including: accessing distinct data streams to be multiplexed and transmitted according to a corresponding plurality of OAM modes; and generating a set of antenna element-specific signals corresponding to respective antenna elements of an antenna array, wherein the antenna element-specific signals are based on corresponding distinct data streams.

In Example 33, the subject matter of Example 32 optionally includes wherein the plurality of OAM modes represent multiple spatial modes of radio wave propagation based on phase-angle offsetting of the distinct data streams.

In Example 34, the subject matter of any one or more of Examples 32-33 optionally include wherein the corresponding distinct data streams are in an offset-phase relationship with one another.

In Example 35, the subject matter of any one or more of Examples 32-34 optionally include wherein each antenna element-specific signal represents a signal component of each one of the plurality of OAM modes.

In Example 36, the subject matter of any one or more of Examples 32-35 optionally include wherein generating the set of antenna element-specific signals includes: operating groups of phase shifters, each group of phase shifters configured to generate an offset-phase relationship between the distinct data streams, and wherein each group of phase shifters is associated with one of the antenna elements.

In Example 37, the subject matter of Example 36 optionally includes wherein generating the set of antenna element-specific signals includes: aggregating outputs of the phase shifters, the outputs corresponding to the antenna elements.

In Example 38, the subject matter of any one or more of Examples 32-37 optionally include wherein each of the distinct data streams includes a signal having a varying progressive phase.

In Example 39, the subject matter of any one or more of Examples 32-38 optionally include wherein generating the set of antenna element-specific signals includes performing fast Fourier transform (FFT) and RF conversion operations to generate the antenna element-specific signals.

In Example 40, the subject matter of any one or more of Examples 32-39 optionally include instructions for applying a beam-steering component to each one of the antenna element-specific signals, the beam-steering component including phase offsetting for angular offsetting of a propagation direction of a radiated wave resulting from transmission of the antenna element-specific signals.

Example 41 is a method for orbital angular momentum (OAM)-based multiplexing, the method comprising: accessing distinct data streams to be multiplexed and transmitted according to a corresponding plurality of OAM modes; and generating a set of antenna element-specific signals corresponding to respective antenna elements of an antenna array, wherein the antenna element-specific signals are based on corresponding distinct data streams.

In Example 42, the subject matter of Example 41 optionally includes wherein the plurality of OAM modes represent multiple spatial modes of radio wave propagation based on phase-angle offsetting of the distinct data streams.

In Example 43, the subject matter of any one or more of Examples 41-42 optionally include wherein the distinct data streams are in an offset-phase relationship with one another.

In Example 44, the subject matter of any one or more of Examples 41-43 optionally include wherein each antenna element-specific signal represents a signal component of each one of the plurality of OAM modes.

In Example 45, the subject matter of any one or more of Examples 41-44 optionally include transferring antenna element excitation signaling to the antenna elements, the antenna element excitation signaling being based on the antenna element-specific signals.

In Example 46, the subject matter of Example 45 optionally includes establishing an antenna array that includes the antenna elements.

In Example 47, the subject matter of any one or more of Examples 45-46 optionally include wherein the antenna elements of the antenna array are arranged in a single elliptical ring pattern.

In Example 48, the subject matter of any one or more of Examples 45-47 optionally include wherein the antenna elements of the antenna array are arranged in a first selectable elliptical ring pattern and a second selectable elliptical ring pattern, and further comprising: selecting between the first and the second selectable elliptical ring patterns.

In Example 49, the subject matter of any one or more of Examples 41-48 optionally include wherein generating the set of antenna element-specific signals includes: operating groups of phase shifters, each group of phase shifters configured to generate an offset-phase relationship between each of the plurality of distinct data streams, and each group of phase shifters being associated with one of the antenna elements.

In Example 50, the subject matter of Example 49 optionally includes wherein generating the set of antenna element-specific signals includes: aggregating outputs of the phase shifters, wherein the outputs of the phase shifters correspond to the antenna elements.

In Example 51, the subject matter of any one or more of Examples 41-50 optionally include wherein each of the distinct data streams includes a signal having a varying progressive phase.

In Example 52, the subject matter of Example 51 optionally includes wherein the varying progressive phase is a continuously-varying progressive phase.

In Example 53, the subject matter of any one or more of Examples 51-52 optionally include wherein each of the distinct data streams is a radio-frequency signal having a common carrier frequency.

In Example 54, the subject matter of any one or more of Examples 41-53 optionally include wherein generating the set of antenna element-specific signals includes performing fast Fourier transform (FFT) and RF conversion operations to generate the antenna element-specific signals.

In Example 55, the subject matter of any one or more of Examples 41-54 optionally include applying a beam-steering component to each one of the antenna element-specific signals, the beam-steering component including phase offsetting for angular offsetting of a propagation direction of a radiated wave resulting from transmission of the antenna element-specific signals.

In Example 56, the subject matter of Example 55 optionally includes wherein the beam-steering component applies a beam axis rotation operation defined by $$2\pi \frac{\rho_a}{\lambda} \sin\theta_o \cos\left(\frac{2\pi(i-1)}{N} - \varphi_o\right),$$

wherein i=1, 2, ..., N, wherein N is the quantity of antenna elements, and wherein $$\frac{\rho_a}{\lambda}$$

represents the array radius normalized to wavelength, wherein $\theta_0$ represents angular offset of a first axis, and wherein $\varphi_0$ represents an angular offset of a second axis.

Example 57 is a method for decoding orbital angular momentum (OAM)-based multiplexed signaling, the method comprising: receiving an aggregated signal containing a plurality of OAM modes, wherein the aggregated signal includes a set of antenna element-specific signals corresponding to respective antenna elements of an antenna array, and each antenna element-specific signal includes a signal component of each one of the OAM modes; and extracting the plurality of distinct data streams from the aggregated signaling, including: splitting apart the portions of each of the OAM modes from a corresponding antenna element-specific signal; and generating a set of data stream-specific phase shifts corresponding to each of the portions of the OAM modes.

In Example 58, the subject matter of Example 57 optionally includes wherein the plurality of OAM modes represent multiple spatial modes of radio wave propagation based on phase-angle offsetting of distinct data streams.

In Example 59, the subject matter of any one or more of Examples 57-58 optionally include providing an antenna array that includes the antenna elements.

In Example 60, the subject matter of any one or more of Examples 57-59 optionally include wherein the antenna elements of the antenna array are arranged in a single elliptical ring pattern.

In Example 61, the subject matter of any one or more of Examples 57-60 optionally include wherein the antenna elements of the antenna array are arranged in a first selectable elliptical ring pattern and a second selectable elliptical ring pattern, wherein the output circuitry is to select between the first and the second selectable elliptical ring patterns.

Example 62 is a system for orbital angular momentum (OAM)-based multiplexing, the system comprising: means for accessing distinct data streams to be multiplexed and transmitted according to a corresponding plurality of OAM modes; and means for generating a set of antenna element-specific signals corresponding to respective antenna elements of an antenna array, wherein the antenna element-specific signals are based on corresponding distinct data streams.

In Example 63, the subject matter of Example 62 optionally includes wherein the plurality of OAM modes represent multiple spatial modes of radio wave propagation based on phase-angle offsetting of the distinct data streams.

In Example 64, the subject matter of any one or more of Examples 62-63 optionally include wherein the distinct data streams are in an offset-phase relationship with one another.

In Example 65, the subject matter of any one or more of Examples 62-64 optionally include wherein each antenna element-specific signal represents a signal component of each one of the plurality of OAM modes.

In Example 66, the subject matter of any one or more of Examples 62-65 optionally include means for transferring antenna element excitation signaling to the antenna elements, the antenna element excitation signaling being based on the antenna element-specific signals.

In Example 67, the subject matter of Example 66 optionally includes an antenna array that includes the antenna elements.

In Example 68, the subject matter of any one or more of Examples 66-67 optionally include wherein the antenna elements of the antenna array are arranged in a single elliptical ring pattern.

In Example 69, the subject matter of any one or more of Examples 66-68 optionally include wherein the antenna elements of the antenna array are arranged in a first selectable elliptical ring pattern and a second selectable elliptical ring pattern, and further comprising: means for selecting between the first and the second selectable elliptical ring patterns.

In Example 70, the subject matter of any one or more of Examples 62-69 optionally include wherein the means for generating the set of antenna element-specific signals includes: means for creating the offset-phase relationship between each of the plurality of distinct data streams, wherein each means for creating the offset-phase relationship is associated with one of the antenna elements.

In Example 71, the subject matter of Example 70 optionally includes wherein the means for generating the set of antenna element-specific signals includes: aggregating outputs of the means for creating the offset-phase relationship, wherein the outputs correspond to the antenna elements.

In Example 72, the subject matter of any one or more of Examples 62-71 optionally include wherein each of the distinct data streams includes a signal having a varying progressive phase.

In Example 73, the subject matter of Example 72 optionally includes wherein each of the distinct data streams is a radio-frequency signal having a common carrier frequency.

In Example 74, the subject matter of any one or more of Examples 62-73 optionally include wherein the means for generating the set of antenna element-specific signals are to perform fast Fourier transform (FFT) and RF conversion operations to generate the antenna element-specific signals.

In Example 75, the subject matter of any one or more of Examples 62-74 optionally include means for applying a beam-steering component to each one of the antenna element-specific signals, the beam-steering component including phase offsetting for angular offsetting of a propagation direction of a radiated wave resulting from transmission of the antenna element-specific signals.

In Example 76, the subject matter of Example 75 optionally includes wherein the beam-steering component applies a beam axis rotation operation defined by $$2\pi \frac{\rho_a}{\lambda} \sin\theta_o \cos\left(\frac{2\pi(i-1)}{N} - \varphi_o\right),$$

wherein i=1, 2, ..., N, wherein N is the quantity of antenna elements, and wherein $$\frac{\rho_a}{\lambda}$$

represents the array radius normalized to wavelength, wherein $\theta_0$ represents angular offset of a first axis, and wherein $\theta_0$ represents an angular offset of a second axis.

Example 77 is a system for decoding orbital angular momentum (OAM)-based multiplexed signaling, the system comprising: means for receiving an aggregated signal containing a plurality of OAM modes, wherein the aggregated signal includes a set of antenna element-specific signals corresponding to respective antenna elements of an antenna array, and each antenna element-specific signal includes a signal component of each one of the OAM modes; and means for extracting the plurality of distinct data streams from the aggregated signaling, including: means for splitting apart the portions of each of the OAM modes from a corresponding antenna element-specific signal; and means for generating a set of data stream-specific phase shifts corresponding to each of the portions of the OAM modes.

In Example 78, the subject matter of Example 77 optionally includes wherein the plurality of OAM modes represent multiple spatial modes of radio wave propagation based on phase-angle offsetting of distinct data streams.

In Example 79, the subject matter of any one or more of Examples 77-78 optionally include an antenna array that includes the antenna elements.

In Example 80, the subject matter of any one or more of Examples 77-79 optionally include wherein the antenna elements of the antenna array are arranged in a single elliptical ring pattern.

In Example 81, the subject matter of any one or more of Examples 77-80 optionally include wherein the antenna elements of the antenna array are arranged in a first selectable elliptical ring pattern and a second selectable elliptical ring pattern, wherein the output circuitry is to select between the first and the second selectable elliptical ring patterns.

The above detailed description includes references to the accompanying drawings, which form a part of the detailed description. The drawings show, by way of illustration, specific examples in which the embodiments can be practiced. These examples are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other examples can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed example. Thus, the following claims are hereby incorporated into the Detailed Description, with each claim standing on its own as a separate example. The scope of the embodiments should be determined with reference to the appended claims, along with the full scope of equivalents to which such claims are entitled.

The invention claimed is:

1. An orbital angular momentum (OAM) mode multiplexing transmission system comprising:
   an antenna array comprising a plurality of antenna elements are arranged in a circular ring pattern;
   circuitry to multiplex a plurality of data streams to generate a set of antenna element-specific signals for simultaneous transmission of a plurality of spatially-multiplexed OAM modes; and
   RF circuitry to upconvert the antenna element-specific signals for transmission by a respective one of the antenna elements of the antenna array;
   wherein the spatially-multiplexed OAM modes comprise at least OAM mode+2, OAM mode+1, and OAM mode 0; and
   wherein the antenna array is configured to generate a spiral phase front in a propagation direction for each of the spatially-multiplexed OAM modes.

2. The OAM mode multiplexing transmission system of claim 1, wherein a number of rotating spiral planes of the spiral phase front correspond to an OAM mode number of the OAM mode.

3. The OAM mode multiplexing transmission system of claim 2, wherein the OAM modes further include OAM mode−1 and OAM mode−2, and
   wherein a rotation direction of the rotating spiral planes of negative numbered OAM modes is opposite a rotation direction of positive numbered OAM modes.

4. The OAM mode multiplexing transmission system of claim 3, wherein the RF circuitry is to upconvert the antenna element-specific signals for transmission at a microwave frequency by a respective one of the antenna elements of the antenna array.

5. The OAM mode multiplexing transmission system of claim 1, wherein the RF circuitry is configured to upconvert the antenna element-specific signals for transmission at a millimeter wave frequency in a 30-100 GHz band.

6. The OAM mode multiplexing transmission system of claim 3, wherein the RF circuitry is configured to upconvert the antenna element-specific signals for backhaul transmission in a $5^{th}$ generation (5G) network.

7. The OAM mode multiplexing transmission system of claim 1, wherein the antenna element-specific signals are generated to be in a phase-offset relation with respect to each other, and
   wherein a phase difference between the antenna element-specific signals is based on a number of the antenna elements arranged in the circular ring pattern and the OAM mode number.

8. The OAM mode multiplexing transmission system of claim 7, wherein the phase difference between successive antenna element-specific signals comprises multiples of $2\pi$ multiplied by the OAM mode number divided by the number of the antenna elements arranged in the circular ring pattern.

9. The OAM mode multiplexing transmission system of claim 3, wherein each of the data streams is transmitted in accordance with one of the OAM modes.

10. The OAM mode multiplexing transmission system of claim 9, wherein the antenna array further comprises a center antenna element.

11. The OAM mode multiplexing transmission system of claim 9, further comprising a digital-to-analog converter (DAC) for each antenna element-specific signal, each DAC to convert one of the antenna element-specific signals to analog prior to upconversion by the RF circuitry.

12. The OAM mode multiplexing transmission system of claim 9, wherein the circuitry to multiplex comprises a field-programmable gate array (FPGA).

13. The OAM mode multiplexing transmission system of claim 9, wherein the circuitry to multiplex comprises a digital signal processor (DSP).

14. The OAM mode multiplexing transmission system of claim 9, wherein the circuitry to multiplex comprises one or more application specific integrated circuits (ASICs).

15. The OAM mode multiplexing transmission system of claim 3, wherein the processing circuitry is to configure the system for operation as a node in a mesh network.

16. A Digital signal processor (DSP) configured for operation in an orbital angular momentum (OAM) mode multiplexing transmission system, the DSP configured to:
multiplex a plurality of data streams to generate a set of antenna element-specific signals for simultaneous transmission of a plurality of spatially-multiplexed OAM modes by an antenna array comprising a plurality of antenna elements arranged in a circular ring pattern; and
provide the antenna element-specific signals to RF circuitry for upconversion and subsequent transmission by a respective one of the antenna elements of the antenna array;
wherein the spatially-multiplexed OAM modes comprise at least OAM mode+2, OAM mode+1, and OAM mode 0; and
wherein the antenna element-specific signals are generated by DSP for generation of a spiral phase front by the antenna array in a propagation direction for each spatially-multiplexed OAM mode.

17. The DSP of claim 16, wherein a number of rotating spiral planes of the spiral phase front correspond to an OAM mode number of the OAM mode.

18. The DSP of claim 17, wherein the OAM modes further include OAM mode−1, and OAM mode−2; and
wherein a rotation direction of the rotating spiral planes of negative numbered OAM modes is opposite a rotation direction of positive numbered OAM modes.

19. The DSP of claim 18, wherein the antenna element-specific signals are generated to be in a phase-offset relation with respect to each other, and
wherein a phase difference between the antenna element-specific signals is based on a number of the antenna elements arranged in the circular ring pattern and the OAM mode number.

20. The DSP of claim 19, wherein the phase difference between successive antenna element-specific signals comprises multiples of $2\pi$ multiplied by the OAM mode number divided by the number of the antenna elements arranged in the circular ring pattern.

21. The DSP of claim 18, wherein each of the data streams is transmitted in accordance with one of the OAM modes.

22. An application specific integrated circuit (ASIC) configured for operation in an orbital angular momentum (OAM) mode multiplexing transmission system, the ASIC configured to:
multiplex a plurality of data streams to generate a set of antenna element-specific signals for simultaneous transmission of a plurality of spatially-multiplexed OAM modes by an antenna array comprising a plurality of antenna elements arranged in a circular ring pattern; and
provide the antenna element-specific signals to RF circuitry for upconversion and subsequent transmission by a respective one of the antenna elements of the antenna array;
wherein the spatially-multiplexed OAM modes comprise at least OAM mode+2, OAM mode+1, and OAM mode 0; and
wherein the antenna element-specific signals are generated by the ASIC for generation of a spiral phase front by the antenna array in a propagation direction for each spatially-multiplexed OAM mode.

23. The ASIC of claim 22, wherein a number of rotating spiral planes of the spiral phase front correspond to an OAM mode number of the OAM mode.

24. The ASIC of claim 23, wherein the OAM modes further include OAM mode−1 and OAM mode−2, and
wherein a rotation direction of the rotating spiral planes of negative numbered OAM modes is opposite a rotation direction of positive numbered OAM modes.

25. The ASIC of claim 24, wherein the antenna element-specific signals are generated to be in a phase-offset relation with respect to each other, and
wherein a phase difference between the antenna element-specific signals is based on a number of antenna elements arranged in the circular ring pattern and the OAM mode number.

26. The ASIC of claim 25, wherein the phase difference between successive antenna element-specific signals comprises multiples of $2\pi$ multiplied by the OAM mode number divided by the number of antenna elements arranged in the circular ring pattern.

27. The ASIC of claim 24, wherein each of the data streams is transmitted in accordance with one of the OAM modes.

28. A field-programmable gate array (FPGA) configured for operation in an orbital angular momentum (OAM) mode multiplexing transmission system, the FPGA configured to:
multiplex a plurality of data streams to generate a set of antenna element-specific signals for simultaneous transmission of a plurality of spatially-multiplex OAM modes by an antenna array comprising a plurality of antenna elements arranged in a circular ring pattern; and
provide the antenna element-specific signals to RF circuitry for upconversion and subsequent transmission by a respective one of the antenna elements of the antenna array;
wherein the spatially-multiplexed OAM modes comprise at least OAM mode+2, OAM mode+1, and OAM mode 0; and
wherein the antenna element-specific signals are generated by FPGA for generation of a spiral phase front by the antenna array in a propagation direction for each spatially-multiplexed OAM mode.

29. The FPGA of claim 28, wherein a number of rotating spiral planes of the spiral phase front correspond to an OAM mode number of the OAM mode.

30. The FPGA of claim 29, wherein the OAM modes further include OAM mode−1 and OAM mode−2, and
wherein a rotation direction of the rotating spiral planes of negative numbered OAM modes is opposite a rotation direction of positive numbered OAM modes.

31. The FPGA of claim 30, wherein the antenna element-specific signals are generated to be in a phase-offset relation with respect to each other, and
wherein a phase difference between the antenna element-specific signals is based on a number of the antenna elements arranged in the circular ring pattern in the OAM mode number.

32. The FPGA of claim 31, wherein the phase difference between successive antenna element-specific signals comprises multiples of $2\pi$ multiplied by the OAM mode number divided by the number of the antenna elements arranged in the circular ring pattern.

33. The FPGA of claim 30, wherein each of the data streams is transmitted in accordance with one of the OAM modes.

34. A backhaul station configured for transmission of orbital angular momentum (OAM) mode multiplexing transmissions, the backhaul station comprising:
- an antenna array comprising a plurality of antenna elements arranged in a circular ring pattern;
- circuitry to multiplex a plurality of data streams to generate a set of antenna element-specific signals for simultaneous transmission of a plurality of spatially-multiplexed OAM modes; and
- RF circuitry to upconvert the antenna element-specific signals for transmission by a respective one of the antenna elements of the antenna array;
- wherein the spatially-multiplexed OAM modes comprise at least OAM mode+2, OAM mode+1, and OAM mode 0; and
- wherein the antenna array is configured to generate a spiral phase front in a propagation direction for each of the spatially-multiplexed OAM modes.

35. The backhaul station of claim 34, wherein a number of rotating spiral planes of the spiral phase front correspond to an OAM mode number of the OAM mode.

36. The backhaul station of claim 35, wherein the OAM modes further include OAM mode−1 and OAM mode−2, and
- wherein a rotation direction of the rotating spiral planes of negative numbered OAM modes is opposite a rotation direction of positive numbered OAM modes.

37. The backhaul station of claim 36, wherein the RF circuitry is to upconvert the antenna element-specific signals for transmission at a microwave frequency by a respective one of the antenna elements of the antenna array.

38. The backhaul station of claim 36, wherein the RF circuitry is configured to upconvert the antenna element-specific signals for transmission at a millimeter wave frequency in a 30-100 GHz band.

39. The backhaul station of claim 36, wherein the RF circuitry is configured to upconvert the antenna element-specific signals for backhaul transmission in a fifth generation (5G) network.

40. The backhaul station of claim 36, wherein the antenna element-specific signals are generated to be in a phase-offset relation with respect to each other, and
- wherein a phase difference between the antenna element-specific signals is based on a number of the antenna elements arranged in the circular ring pattern in the OAM mode number.

41. The backhaul station of claim 40, wherein the phase difference between successive antenna element-specific signals comprises multiples of $2\pi$ multiplied by the OAM mode number divided by the number of the antenna elements arranged in the circular ring pattern.

42. The backhaul station of claim 36, wherein each of the data streams is transmitted in accordance with one of the OAM modes.

43. The backhaul station of claim 42, wherein the antenna array further comprises a center antenna element.

44. A method for an orbital angular momentum (OAM) mode multiplexing comprising:
- multiplexing a plurality of data streams to generate a set of antenna element-specific signals for simultaneous transmission of a plurality of spatially-multiplexed OAM modes by an antenna array comprising a plurality of antenna elements arranged in a circular ring pattern; and
- providing the antenna element-specific signals to RF circuitry for upconversion and subsequent transmission by a respective one of the antenna elements of the antenna array;
- wherein the spatially-multiplexed OAM modes comprise at least OAM mode+2, OAM mode+1, and OAM mode 0; and
- wherein the antenna element-specific signals are generated by method for generation of a spiral phase front by the antenna array in a propagation direction for each spatially-multiplexed OAM mode.

45. The method of claim 44, wherein a number of rotating spiral planes of the spiral phase front correspond to an OAM mode number of the OAM mode.

46. The method of claim 45, wherein the OAM modes further include OAM mode−1 and OAM mode−2, and
- wherein a rotation direction of the rotating spiral planes of negative numbered OAM modes is opposite a rotation direction of positive numbered OAM modes.

47. The method of claim 46, further comprising generating the antenna element-specific signals to be in a phase-offset relation with respect to each other, and
- wherein a phase difference between the antenna element-specific signals is based on a number of the antenna elements arranged in the circular ring pattern and the OAM mode number.

48. The method of claim 47, wherein the phase difference between successive antenna element-specific signals comprises multiples of $2\pi$ multiplied by the OAM mode number divided by the number of the antenna elements arranged in the circular ring pattern.

49. The method of claim 46, further comprising transmitting each of the data streams in accordance with one of the OAM modes.

* * * * *